United States Patent
Alt et al.

(10) Patent No.: US 11,609,810 B2
(45) Date of Patent: Mar. 21, 2023

(54) TECHNOLOGIES FOR PREDICTING COMPUTER HARDWARE PERFORMANCE WITH MACHINE LEARNING

(71) Applicant: Intel Corporation, Santa Clara, CA (US)

(72) Inventors: Samantha Alt, Portland, OR (US); Derssie Mebratu, Hillsboro, OR (US); Nishi Ahuja, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1126 days.

(21) Appl. No.: 16/213,969

(22) Filed: Dec. 7, 2018

(65) Prior Publication Data

US 2019/0147364 A1 May 16, 2019

Related U.S. Application Data

(60) Provisional application No. 62/595,710, filed on Dec. 7, 2017.

(51) Int. Cl.
| | |
|---|---|
| *G06F 11/00* | (2006.01) |
| *G06F 11/07* | (2006.01) |
| *G06F 11/34* | (2006.01) |
| *G06F 11/30* | (2006.01) |

(52) U.S. Cl.
CPC ........ *G06F 11/079* (2013.01); *G06F 11/0751* (2013.01); *G06F 11/3037* (2013.01); *G06F 11/3058* (2013.01); *G06F 11/3433* (2013.01)

(58) Field of Classification Search
None
See application file for complete search history.

(56) References Cited

U.S. PATENT DOCUMENTS

| | | | | |
|---|---|---|---|---|
| 9,069,737 | B1* | 6/2015 | Kimotho | G06F 11/0709 |
| 10,572,323 | B1* | 2/2020 | Zhai | G06F 11/008 |
| 2015/0006734 | A1* | 1/2015 | Parikh | G06F 9/50 |
| | | | | 709/226 |
| 2017/0350403 | A1* | 12/2017 | Kelly | F04D 27/001 |
| 2019/0163546 | A1* | 5/2019 | Ungar | G06F 11/3476 |

OTHER PUBLICATIONS

Google Scholar/Patents—two searches—text refined (Year: 2022).*
Google Scholar/Patents search—text refined (Year: 2022).*
B. Schroeder, E. Pinheiro and W. Weber, "DRAM Errors in the wild: A Large-Scale Field Study," ~SIGMETRICS/Performance'09, Jun. 15-19, 2009, Seattle, WA, USA.
A. Agrawal, A. Ansari, and J. Torrellas. Mosaic: Exploiting the spatial locality of process variation to reduce refresh energy in on-chip eDRAM modules. In HPCA, 2014.
Kevin K. Chang, "Understanding and Improving the Latency of DRAM-based Memory Subsystems," PhD thesis, Carnegie Melon University, dated May 2017.

* cited by examiner

*Primary Examiner* — Christopher S McCarthy
(74) *Attorney, Agent, or Firm* — Compass IP Law, PC

(57) ABSTRACT

Technologies for predicting computer hardware performance with machine learning are disclosed. Analysis of telemetry data through machine learning and statistical modeling is used to determine whether various components of a compute device such as a fan or memory are failing or are otherwise potentially impacting performance of the compute device. For example, machine-learning-based algorithms may be used to determine an impact of a latency of memory accesses may have on time to execute workloads.

5 Claims, 10 Drawing Sheets

TECHNOLOGIES FOR PREDICTING COMPUTER HARDWARE PERFORMANCE WITH MACHINE LEARNING

CROSS-REFERENCE TO RELATED APPLICATIONS

The present application claims the benefit of U.S. Provisional Patent Application No. 62/595,710, filed Dec. 7, 2017.

BACKGROUND

Components in compute devices may negatively impact overall performance if the components are near maximum utilization or the components fail. For example, a memory device of a compute device may be able to send data to a processor of the compute device at a certain maximum rate. If the processor is requesting data at a rate that maximum rate, then the latency of memory requests may increase, affecting performance of the workloads on the compute device.

If components of a compute device fail, then performance can be affected as well. For example, if a memory device of a compute device fails, such as by having a large number of errors, then performance of workloads on the compute device may degrade or data may be lost. Similarly, if a fan of a compute device fails, such as by not turning at the specified speed, then components of the compute device may overheat.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
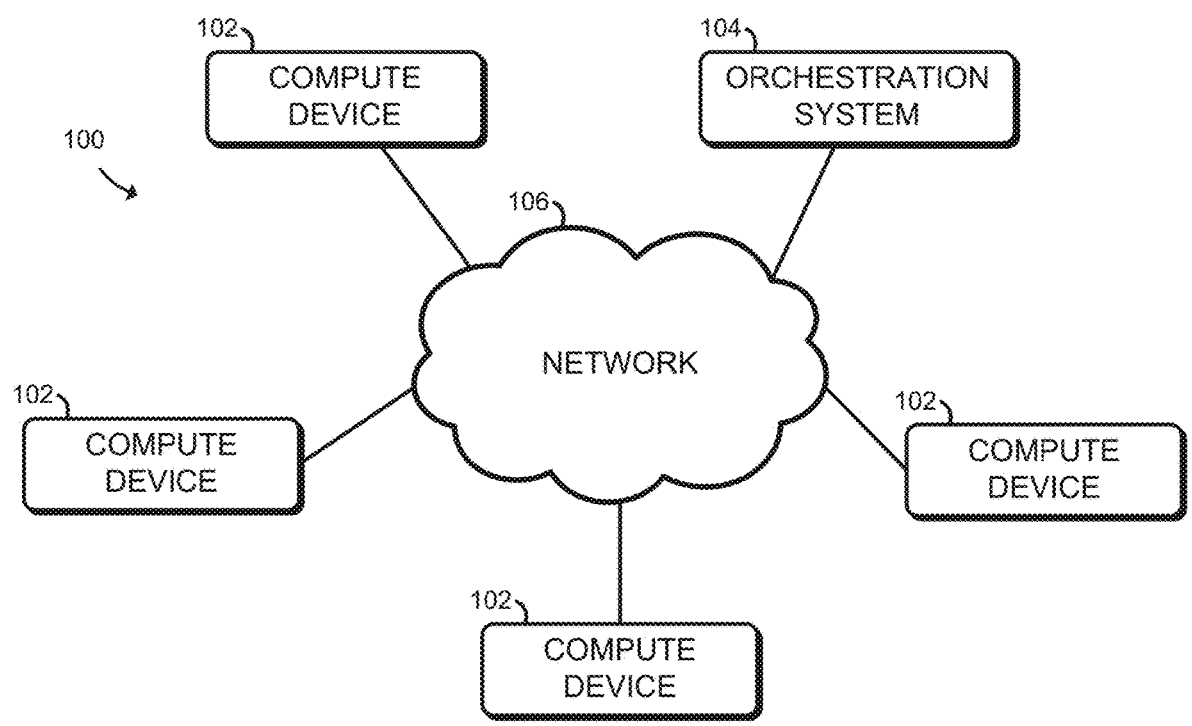
FIG. 1 is a simplified block diagram of a network connecting compute devices and an orchestration system.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 includes several compute devices 102 and an orchestration system 104 connected by a network 106. In the illustrative embodiment, the system 100 is a data center, and the orchestration system 104 controls which workloads are executed on the compute devices 102. The compute devices 102 may monitor telemetry data as workloads are being executed on the compute devices 102, such as processor utilization, memory utilization, temperature, power used, fan speed, etc. The telemetry data may be analyzed using machine-learning-based algorithms, such as k-means clustering, support vector machines, and Bayesian dynamic networks. The analysis may be done on the compute device 102 and/or the orchestration system 104.

The network 106 may be embodied as any type of network capable of communicatively connecting the compute devices 102 and the orchestration system 104. For example, the system 100 may be embodied as a high performance computing system or a data center, and the network 106 may be established through a series of cables, switches, and other devices connecting the various compute devices 102 and orchestration system 104 of the data center. It should be appreciated that, in some embodiments, the techniques described herein may be performed by a single compute device 102, and the system 100 may not require a network 106.

Figure 2:
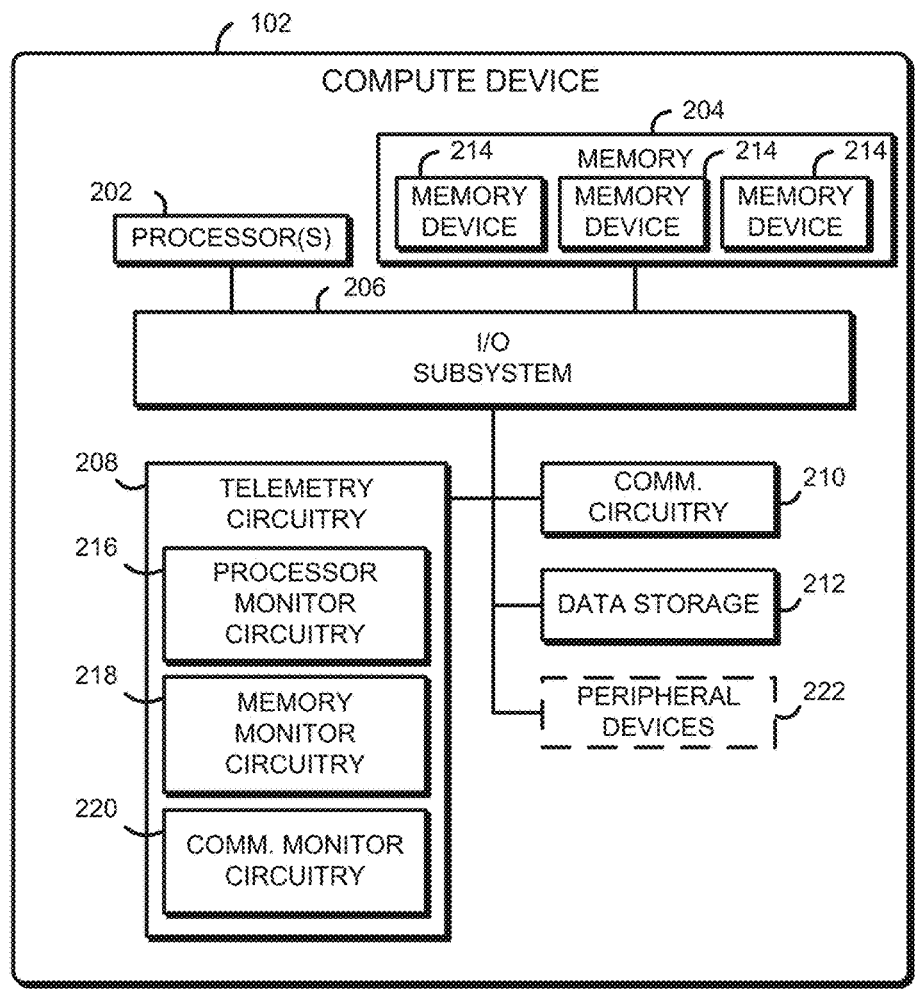
FIG. 2 is a simplified block diagram of at least one embodiment of the compute device of FIG. 1.

Referring now to FIG. 2, an illustrative compute device 102 of the system 100 may be embodied as any type of compute device capable of performing the functions described herein. For example, the compute device 102 may be embodied as or otherwise be included in, without limitation, a server computer, a desktop computer, a sled or blade of a rack, a disaggregated computing system such as a rack scale architecture system, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device.

The illustrative compute device 102 includes the processor 202, a memory 204, an input/output (I/O) subsystem 206, telemetry circuit 208, communication circuitry 210, and data storage 212. In some embodiments, one or more of the illustrative components of the compute device 102 may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a microcontroller, or other processor or processing/controlling circuit.

Similarly, the memory 204 may be embodied as any type of volatile or non-volatile memory or data storage capable of performing the functions described herein. In operation, the memory 204 may store various data and software used during operation of the compute device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the compute device 102 on a single integrated circuit chip.

The memory 204 may include one or more memory devices 214. As used herein, a memory device 214 refers to a discrete physical device or component that makes up part of the memory 214. For example, a memory device 214 may be a dual in-line memory module (DIMM), and the memory 204 may include multiple DIMMs. A memory device 214 may also refer to a single chip, such as a chip on a DIMM. It should be appreciated that, in some embodiments, some or all of the memory 204 may be disaggregated from the processor 202 and may be able to support more than one processor 202.

The telemetry circuitry 208 is configured to monitor parameters of the compute device 102 during execution of workloads. The telemetry circuit 208 may include, inter alia, processor monitor circuitry 216, memory monitor circuitry 218, and communication monitor circuitry 220. The processor monitor circuitry 216 may monitor processor utilization, cache utilization, a number or rate of cache misses, instructions per second, time to execute a workload or task, and processor temperature. The memory monitor circuitry 218 may monitor memory allocation utilization, memory bandwidth, a number or rate of correctable errors, a number or rate of uncorrectable errors, an amount of swap memory used, and a temperature of the memory 204 or memory devices 214. The communication monitor circuitry 220 may monitor a rate of network traffic flow and other parameters related to network traffic. Additionally or alternatively, in some embodiments, the telemetry circuit 208 may monitor parameters such as power usage, voltage levels of, e.g., the processor 202 or the memory 204, a speed or voltage of one or more fans, etc. The telemetry circuitry 208 may monitor the various parameters continuously, continually, and/or periodically.

The telemetry circuitry 208 may be embodied as one or more circuits, electronic devices, and/or electronic components distributed throughout the compute device 102. For example, a portion of the telemetry circuitry 208 may be embedded in the processor 202, a portion may be embedded in the memory 204, a portion may be embedded in the communication circuitry 210, etc. The telemetry circuitry 208 may communicate with other components through dedicated communication channels, such as wires that are only used for communication of telemetry information, or the telemetry circuit 208 may communicate with other components over a shared channel. In some embodiments, some or all of the telemetry circuitry 208 may be embodied as or otherwise be compatible with the Intelligent Platform Management Interface (IMPI). Additionally or alternatively, in some embodiments, some or all of the telemetry circuitry 208 may be embodied as or otherwise be compatible with Intel® Resource Director Technology (RDT).

The communication circuitry 210 may be embodied as any type of interface capable of interfacing the compute device 102 with the network 106. The communication circuitry 210 may also be referred to or be embodied as a network interface controller (NIC). The communication circuitry 210 may be capable of interfacing with any appropriate cable type, such as an electrical cable or an optical cable. The communication circuitry 210 may be configured to use any one or more communication technology and associated protocols (e.g., Ethernet, Bluetooth®, Wi-Fi®, WiMAX, near field communication (NFC), Omni-Path, etc.). Furthermore, in some embodiments, the communication circuitry 210 may be in a package separate from the processor 202, in a multi-chip package with the processor 202, or in a system-on-a-chip with the processor 202.

The data storage 212 may be embodied as any type of device or devices configured for the short-term or long-term storage of data. For example, the data storage 212 may include any one or more memory devices and circuits, memory cards, hard disk drives, solid-state drives, or other data storage devices.

Of course, in some embodiments, the compute device 102 may include additional components often found in a compute device 102, such one or more peripheral devices 216. The peripheral devices 216 may include a display, a keyboard, a mouse, a camera, etc. The display may be embodied as any type of display on which information may be displayed to a user of the compute device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 3:
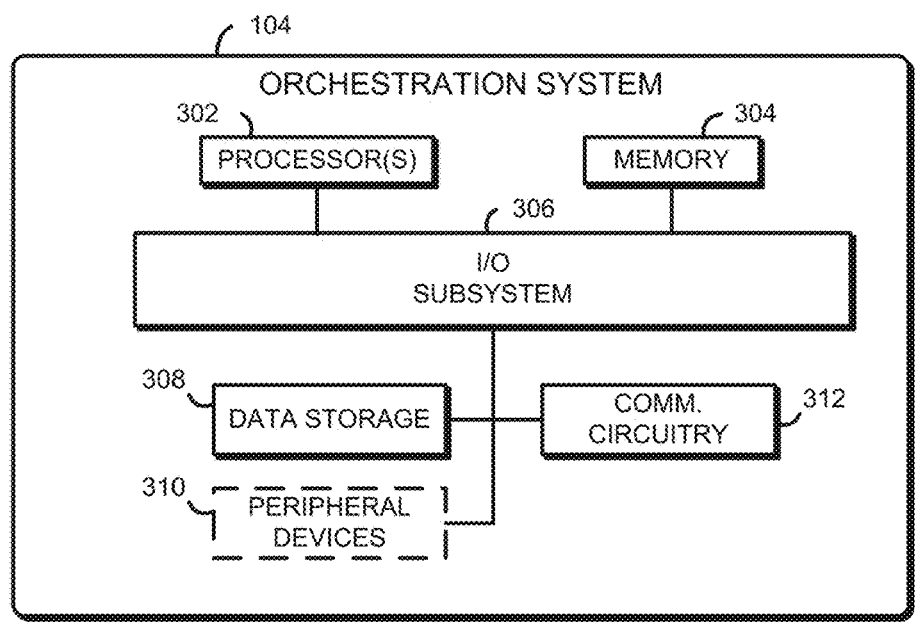
FIG. 3 is a simplified block diagram of at least one embodiment of the orchestration system of FIG. 1.

Referring now to FIG. 3, the orchestration system 104 of the system 100 may be embodied as any type of compute device capable of performing the functions described herein. For example, the orchestration system 104 may be embodied as or otherwise be included in, without limitation, a server computer, a desktop computer, a sled or blade of a rack, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device. In some embodiments, the functionality of the orchestration system 104 may be split among multiple compute devices. For example, training of machine-learning-based algorithms may be performed on one compute device, while execution of the machine-learning-based algorithms may be performed on a different compute device.

In the illustrative embodiment, the orchestration system 104 is a separate device from the compute device 102, and the orchestration system 104 may be responsible for analyzing and processing some or all of the telemetry data generated by one or more compute devices 102. The orchestration system 104 may be responsible for taking action based on the analysis, such as moving workloads from one compute device 104 to another compute device 104 or reallocating resources on the compute device 104. It should be appreciated that, in some embodiments, the orchestration system 104 and the compute device 102 may be the same device and the compute device 102 may perform some or all of the functionality of the orchestration system 104 described herein. For example, the telemetry data may be gather and analyzed on the compute device 102, and any actions taken in response to the analysis may be initiated and performed by the compute device 102.

The orchestration system 104 may include a processor 302, a memory 304, an input/output (I/O) subsystem 306, data storage 308, communication circuitry 312, and peripheral devices 310. The processor 302, memory 304, the I/O subsystem 306, the data storage 308, and the communication circuitry 312 may be similar to the corresponding components of the compute device 102, and the description of those components will not be repeated in the interest of clarity.

Figure 4:
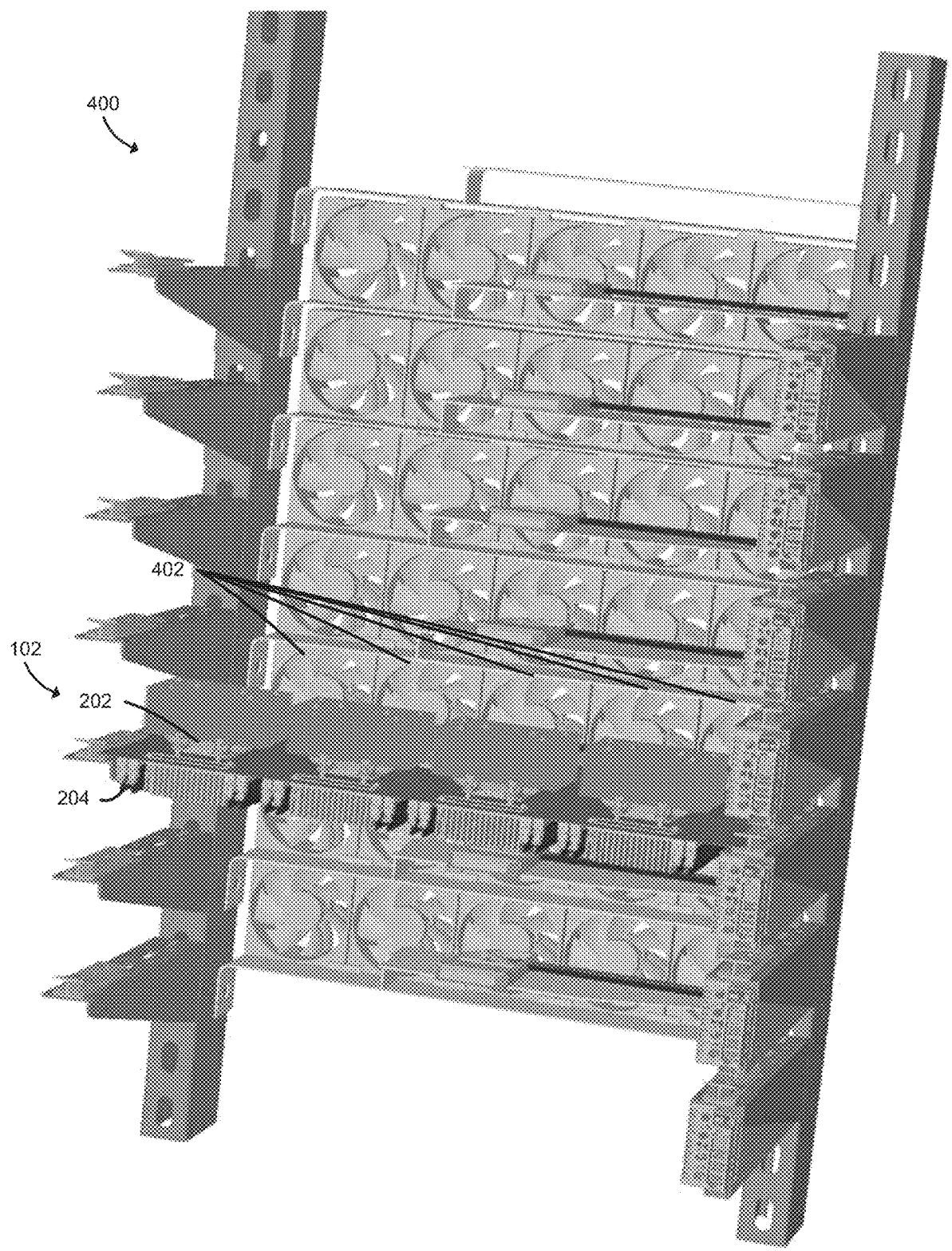
FIG. 4 is a sketch of at least one embodiment of rack that may include the compute device of FIG. 2.

Referring now to FIG. 4, in some embodiments, some or all of the system 100 may be embodied as a rack 400. The rack 400 shown has a compute device 102, which includes the processor 202 and the memory 204. The rack 400 also includes several fans 402. The fans 402 may be controlled by the compute device 102 or by some other device, such as the orchestration system 104. The compute device 102 and/or the orchestration system 104 may monitor the fans 402, such as by monitoring the rotations per minute and/or the voltage applied. It should be appreciated that, in some embodiments, the fans 402 may be additionally or alternatively placed in different positions relative to the various components of the compute device 102. For example, in some embodiments, there may be a fan 402 that is dedicated to cooling a processor 202.

Figure 5:
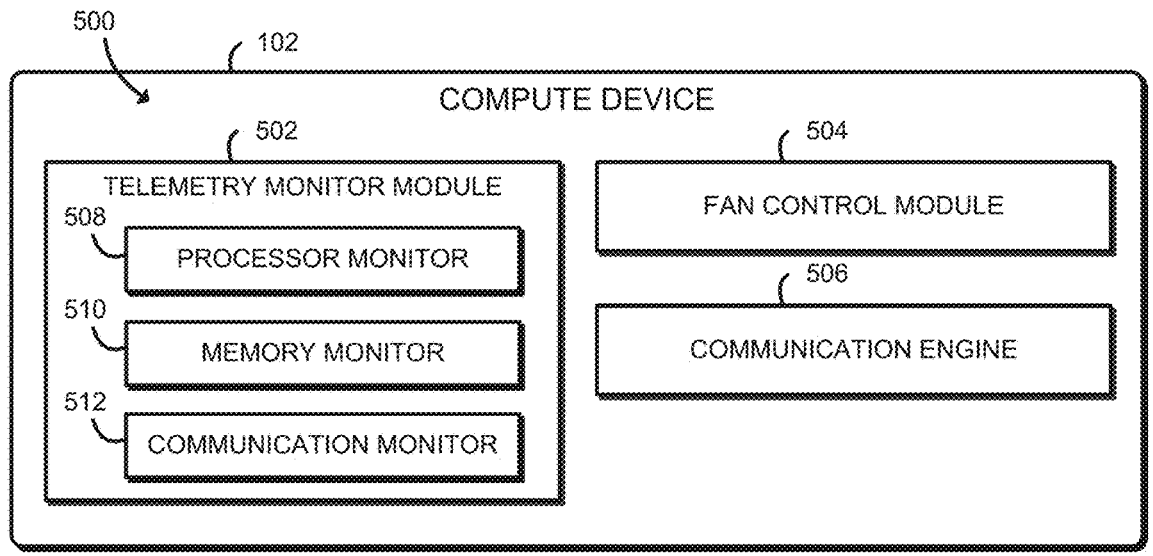
FIG. 5 is a block diagram of at least one embodiment of an environment that may be established by the compute device of FIG. 2.

Referring now to FIG. 5, in an illustrative embodiment, the compute device 102 establishes an environment 500 during operation. The illustrative environment 500 includes a telemetry monitor module 502, a fan control module 504, and a communication engine 506. The various components of the environment 500 may be embodied as hardware, software, firmware, or a combination thereof. For example, the various components of the environment 500 may form a portion of, or otherwise be established by, the processor 202, the memory 204, or other hardware components of the compute device 102. As such, in some embodiments, one or more of the components of the environment 500 may be embodied as circuitry or collection of electrical devices (e.g., telemetry monitor circuitry 502, fan control circuitry 504, etc.). It should be appreciated that, in such embodiments, one or more of the circuits (e.g., the telemetry control circuitry 502, the fan control circuitry 504, etc.) may form a portion of one or more of the processor 202, the memory 204, the I/O subsystem 206, the communication circuitry 210, the data storage 212, an application specific integrated circuit (ASIC), a programmable circuit such as a field-programmable gate array (FPGA), and/or other components of the compute device 102. For example, the telemetry monitor circuitry 502 may be embodied as the processor 202 and associated instructions stored on the data storage 212 and/or the memory 204 that may be executed by the processor 202. Additionally, in some embodiments, one or more of the illustrative components may form a portion of another component and/or one or more of the illustrative components may be independent of one another. Further, in some embodiments, one or more of the components of the environment 500 may be embodied as virtualized hardware components or emulated architecture, which may be established and maintained by the processor 202 or other components of the compute device 102. It should be appreciated that some of the functionality of one or more of the components of the environment 500 may require a hardware implementation, in which case embodiments of components which implement such functionality will be embodied at least partially as hardware.

The telemetry monitor module 502, which may be embodied as hardware (e.g., circuitry), firmware, software, virtualized hardware, emulated architecture, and/or a combination thereof as discussed above, is configured to monitor telemetry parameters on the compute device 102. In the illustrative embodiment, the telemetry monitor module 502 is embodied as the telemetry circuitry 208. The telemetry monitor module 502 includes a processor monitor 508, a memory monitor 510, and a communication monitor 512. The processor monitor 508 may monitor processor utilization, cache utilization, a number or rate of cache misses, instructions per second, time to execute a workload or task, and processor temperature. The memory monitor 510 may monitor memory allocation utilization, memory bandwidth, a number or rate of correctable errors, a number or rate of uncorrectable errors, an amount of swap memory used, and a temperature of the memory 204 or memory devices 214. The communication monitor circuitry 220 may monitor a rate of network traffic flow and other parameters related to network traffic. Additionally or alternatively, in some embodiments, the telemetry monitor module 502 may monitor parameters such as power usage, voltage levels of, e.g., the processor 202 or the memory 204, a speed or voltage of one or more fans, etc. The telemetry monitor module 502 may monitor the various parameters continuously, continually, and/or periodically.

The fan control module 504, which may be embodied as hardware (e.g., circuitry), firmware, software, virtualized hardware, emulated architecture, and/or a combination thereof as discussed above, is configured to control one or more fans 402 of the compute device 102. The fan control module 504 may control the fans 402 by, e.g., setting a rotations per minute (RPM) level and/or voltage level on the fans 402.

The communication engine 506 is configured to control the communication circuitry 210. The communication engine 506 processes incoming messages from other compute devices as well as instructions from the local compute device 102 and outgoing messages from the local compute device 102. The communication engine 506 may be configured to use any one or more communication technology and associated protocols (e.g., Ethernet, Bluetooth®, Wi-Fi®, WiMAX, near field communication (NFC), etc.). In the illustrative embodiment, the communication engine 506 sends telemetry data to the orchestration system 104.

Figure 6:
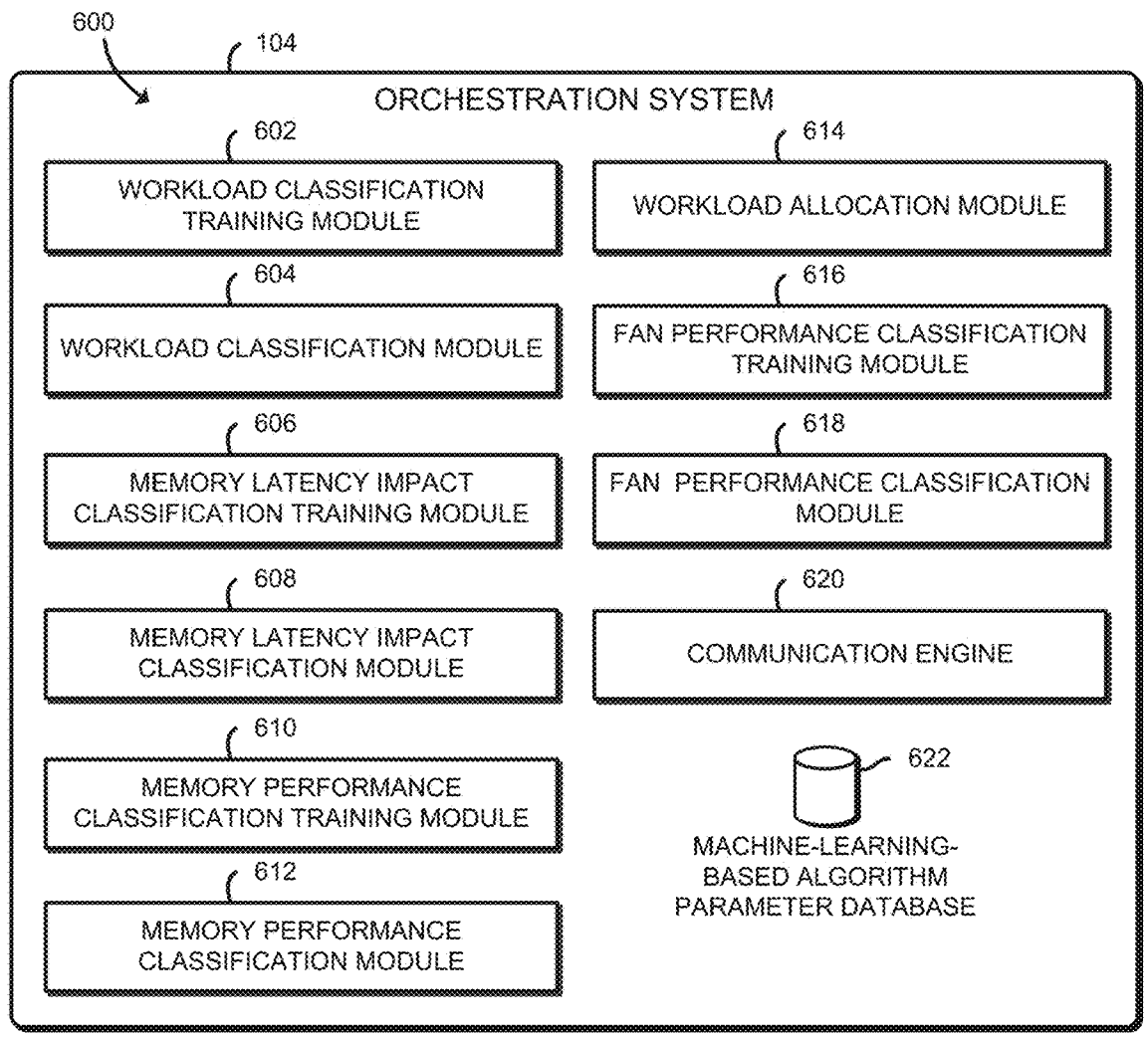
FIG. 6 is a block diagram of at least one embodiment of an environment that may be established by the orchestration system of FIG. 3.

Referring now to FIG. 6, in an illustrative embodiment, the orchestration system 104 establishes an environment 600 during operation. The illustrative environment 600 includes a workload classification training module 602, a workload classification module 604, a memory latency impact classification training module 606, a memory latency impact classification module 608, a memory performance classification training module 610, a memory performance classification module 612, a workload allocation module 614, a fan performance classification training module 616, a fan performance classification module 618, a communication engine 620, and machine-learning-based algorithm parameter database 622. The various components of the environment 600 may be embodied as hardware, software, firmware, or a combination thereof. For example, the various components of the environment 600 may form a portion of, or otherwise be established by, the processor 302, the memory 304, or other hardware components of the orchestration system 104. As such, in some embodiments, one or more of the components of the environment 600 may be embodied as circuitry or collection of electrical devices (e.g., workload classification training circuitry 602, workload classification circuitry 604, etc.). It should be appreciated that, in such embodiments, one or more of the circuits (e.g., the workload classification training circuitry 602, the workload classification circuitry 604, etc.) may form a portion of one or more of the processor 302, the memory 304, the I/O subsystem 306, the communication circuitry 312, the data storage 308, an application specific integrated circuit (ASIC), a programmable circuit such as a field-programmable gate array (FPGA), and/or other components of the orchestration system 104. For example, the workload classification training module 602 may be embodied as the processor 302 and associated instructions stored on the data storage 308 and/or the memory 304 that may be executed by the processor 302. Additionally, in some embodiments, one or more of the illustrative components may form a portion of another component and/or one or more of the illustrative components may be independent of one another. Further, in some embodiments, one or more of the components of the environment 600 may be embodied as virtualized hardware components or emulated architecture, which may be established and maintained by the processor 302 or other components of the orchestration system 104. It should be appreciated that some of the functionality of one or more of the components of the environment 600 may require a hardware implementation, in which case embodiments of components which implement such functionality will be embodied at least partially as hardware.

The workload classification training module 602, which may be embodied as hardware (e.g., circuitry), firmware, software, virtualized hardware, emulated architecture, and/or a combination thereof as discussed above, is configured to train a workload classification machine-learning-based algorithm. The workload classification training module 602 may train a machine-learning-based algorithm based on telemetry data from training workloads performed on the compute device 102. The workload classification training module 602 may use any suitable machine-learning-based algorithm to train an algorithm to classify workloads, such as k-means clustering or a support vector machine. For example, in the illustrative embodiment, the workload classification training module 602 may use a k-means clustering algorithm to cluster workloads based on some or all of the telemetry data such as processor utilization, cache utilization, a number or rate of cache misses, memory allocation utilization, memory bandwidth, a number or rate of correctable errors, a number or rate of uncorrectable errors, a rate of network traffic flow, etc. The workload classification training module 602 may generate parameters for the machine-learning-based algorithms, which can be saved in the machine-learning-based algorithm parameter database 622 for future use.

In some embodiments, the workload classification training module 602 may train several machine-learning-based algorithms in different environments, such as different hardware, software, or workload configurations. For example, the workload classification training module 602 may train one machine-learning-based algorithm in a generic environment with multiple types of workloads and train another machine-learning-based algorithm in a more specialized environment, such as a software-as-a-service or enterprise environment. The parameters for each machine-learning-based algorithm may be saved in the machine-learning-based algorithm parameter database 622, and, in future execution of the machine-learning-based algorithm, the parameters associated with the environment in which the algorithm will be used can be chosen from the machine-learning-based algorithm parameter database 622.

The workload classification module 604, which may be embodied as hardware (e.g., circuitry), firmware, software, virtualized hardware, emulated architecture, and/or a combination thereof as discussed above, is configured to classify a workload with use of a machine-learning-based algorithm.

The workload classification module 604 may determine which parameters of the machine-learning-based algorithm parameter database 622 to use based on the particular environment in which the compute device 102 is operating. The workload classification module 604 uses telemetry data to classify the workload. The telemetry data may include any suitable data, such as processor utilization, cache utilization, a number or rate of cache misses, memory allocation utilization, memory bandwidth, a number or rate of correctable errors, a number or rate of uncorrectable errors, and a rate of network traffic flow. In the illustrative embodiment, the classification module 604 classifies the current workload with a k-means clustering algorithm.

The memory latency impact classification training module 606, which may be embodied as hardware (e.g., circuitry), firmware, software, virtualized hardware, emulated architecture, and/or a combination thereof as discussed above, is configured to train a memory latency impact classification machine-learning-based algorithm. The latency of the memory 204 may be impacted from any number of causes, such as saturation of the memory bandwidth, degradation or failure of a memory device 214, etc. The impact of the latency of the memory 204 may affect various aspects of the performance of the workload, such as a shift in the probability density function (PDF) of execution time of workloads. The amount of the shift may be correlated with various factors, such as the telemetry data gathered during execution of the workload or the classification of the workload. For example, one workload may not be significantly impacted by a slight or moderate increase in memory latency while a different workload might be significantly impacted by even a slight increase in memory latency.

The memory latency impact classification training module 606 may train a machine-learning-based algorithm using input such as processor utilization, cache utilization, a number or rate of cache misses, time to execute a workload or task, memory allocation utilization, memory bandwidth, a number or rate of correctable errors, a number or rate of uncorrectable errors, and an amount of swap memory used. In some embodiments, the memory latency impact classification training module 606 may train a machine-learning-based algorithm using labeled training data that indicates how the telemetry data associated with a particular training workload should be classified. The memory latency impact classification module 606 may train any suitable machine-learning-based algorithm. In the illustrative embodiment, the memory latency impact classification training module 606 trains a support vector machine. The illustrative support vector machine has four classifications. The four illustrative classifications indicate that the impact of memory latency is (i) normal, (ii) shifting towards performance impacts, such as small shifts in the peak of the probability density function (PDF) of task completion times and introduction of increase of errors in the memory's error correcting codes (ECC), (iii) shifting towards more significant performance impacts through shifts in the PDF of task completion times, significant increase in ECC errors, and changes in resource utilization, and (iv) abnormal, such as abnormal utilization with no impacts on performance or occurrence of ECC errors.

The memory latency impact classification module 608, which may be embodied as hardware (e.g., circuitry), firmware, software, virtualized hardware, emulated architecture, and/or a combination thereof as discussed above, is configured to classify an impact of the latency of memory access on the current workload with a machine-learning-based algorithm using the telemetry data. To do so, the memory latency impact classification module 608 may use telemetry data such as processor utilization, cache utilization, a number or rate of cache misses, time to execute a workload or task, memory allocation utilization, memory bandwidth, a number or rate of correctable errors, a number or rate of uncorrectable errors, and an amount of swap memory use. In the illustrative embodiment, the memory latency impact classification module 608 classifies the impact of the latency of memory accesses on the current workload using a support vector machine with parameters retrieved from the machine-learning-based algorithm parameter database 622.

The memory performance classification training module 610, which may be embodied as hardware (e.g., circuitry), firmware, software, virtualized hardware, emulated architecture, and/or a combination thereof as discussed above, is configured to train a machine-learning-based algorithm for determination of a likelihood of failure of a memory device 214. The memory performance classification training module 610 may use telemetry data, which may include, e.g., processor utilization, cache utilization, a number or rate of cache misses, memory allocation utilization, memory bandwidth, a number or rate of correctable errors, a number or rate of uncorrectable errors, a temperature of components such as the processor 202 and/or memory devices 214, and instructions per second. The memory performance classification training module 610 may preprocesses the telemetry data. The memory performance classification training module 610 may remove any irrelevant or redundant data and use a learning vector quantization classifier to classify the data. The correlation for the data may be computed, and the data may be regrouped according to the correlation coefficient before further processing.

In training a machine-learning-based algorithm for determination of a likelihood of failure of a memory device 214, the memory performance classification training module 610 may use any number of parameters of telemetry data, such as processor utilization, memory bandwidth utilization, memory temperature, etc. In the illustrative embodiment, the parameters used in the machine-learning-based algorithm are (i) processor utilization, (ii) cache utilization, (iii) memory utilization, (iv) correctable errors, (v) memory temperature, (vi) instructions per second, and (vii) memory bandwidth. In some embodiments, the memory performance classification training module 610 may train a machine-learning-based algorithm using labeled training data that indicates how likely it is that a memory device 214 will fail. The output of the machine-learning-based algorithm provides an indication of a failure likelihood of a memory device 214. The output may be a classification into a certain range of likelihood or the output may be, e.g., a single parameter that may be compared to a threshold.

In the illustrative embodiment, the memory performance classification training module 610 trains a Bayesian dynamic network to determine a relationship between features over time. For example, processor utilization at one time step may be mapped to processor utilization, memory utilization, and memory bandwidth at the next time step. Similarly, memory utilization at one time step may be mapped to memory bandwidth, memory utilization, and memory temperature at the next time step. The Bayesian dynamic network may be configured with any combination of features at one time step being mapped to any combination of features at the next time step. In the illustrative embodiment, the Bayesian dynamic network provides a single output parameter indicative of a likelihood of failure of a memory device 214.

The memory performance classification module 612, which may be embodied as hardware (e.g., circuitry), firmware, software, virtualized hardware, emulated architecture, and/or a combination thereof as discussed above, is configured to analyze telemetry data with a machine-learning-based algorithm to generate an output indicative of a likelihood of failure of a memory device 214 of the compute device 102. To do so, the memory performance classification module 612 may use telemetry data such as processor utilization, memory bandwidth utilization, memory temperature. In some embodiments, the memory performance classification module 612 preprocesses the telemetry data. The memory performance classification module 612 may remove any irrelevant or redundant data and use a learning vector quantization classifier to classify the data. The correlation for the data may be computed, and the data may be regrouped according to the correlation coefficient before further processing.

In the illustrative embodiment, the memory performance classification module 612 uses a Bayesian dynamic network, using as input (i) processor utilization, (ii) cache utilization, (iii) memory utilization, (iv) correctable errors, (v) memory temperature, (vi) instructions per second, and (vii) memory bandwidth. In the illustrative embodiment, the output of the Bayesian dynamic network is a single value that can be compared to a threshold.

The workload allocation module 614, which may be embodied as hardware (e.g., circuitry), firmware, software, virtualized hardware, emulated architecture, and/or a combination thereof as discussed above, is configured to allocate resources of one or more compute devices 102 for particular workloads. For example, the workload allocation module 614 may perform an initial allocation of a workload on a compute device 102. The workload allocation module 614 may also determine if a change in allocation is necessary. For example, the workload allocation module 614 may determine whether an impact of latency of memory accesses on a workload is unacceptable based on the output of the memory latency impact classification module 608, such as by determining that the impact is in a class that is predetermined to be unacceptable. The workload allocation module 614 may also determine whether an action should be taken to mitigate the impact of a failure of the memory device 214 based on the output of the memory performance classification module 612, such as by comparing the output to a predetermined threshold. If a change in allocation is necessary, the workload allocation module 614 may reallocate resources and workloads accordingly. For example, the workload allocation module 614 may move some or all of the data from one memory device 214 to another memory device 214. Additionally or alternatively, the workload allocation module 614 may migrate a workload to a different compute device 102. In some embodiments, the workload allocation module 614 may provide an alert to an administrator that a memory device 214 needs to be replaced, and an administrator may then replace the memory device 214.

The fan performance classification training module 616, which may be embodied as hardware (e.g., circuitry), firmware, software, virtualized hardware, emulated architecture, and/or a combination thereof as discussed above, is configured to determine parameters for an algorithm to determine a likelihood of failure of a fan 402 of a compute device 102. To do so, the fan performance classification training module 616 may use telemetry data of fan speeds from a compute device 102. The fan speeds may be from fans 402 in one or more compute devices 102. The fan speeds may be instantaneous measurements or may be averages over some amount of time, such as five minutes. The fan speeds may be sampled continuously, continually, or periodically, such as every 1-20 minutes. In the illustrative embodiment, the fan speeds are sampled every five minutes. In some embodiments, the fan performance classification training module 616 may preprocess the telemetry data prior to determining the parameters of the algorithm. The fan performance classification training module 616 may remove any irrelevant or redundant data. The fan performance classification training module 616 may use any suitable algorithm for determining the likelihood of failure of a fan 402, such as a statistical model or a machine-learning-based algorithm. The fan performance classification training module 616 may save the parameters for the algorithms in the machine-learning-based algorithm parameter database 622.

In the illustrative embodiment, the fan performance classification training module 616 determines a statistical model of fan speeds. The fan speeds may correspond to a compute device 102 and be grouped according to which fan 402 of the compute device 102 the speeds are associated with. The fan speeds of n fans 402 of a compute device 102 at a given time may be represented by a vector $X=\{x_1, x_2, \ldots x_n\}$, where $x_n$ is the speed for fan n. Each fan n has an average speed $\overline{X}_n$ and standard deviation $\sigma$. Similarly, the speeds of multiple fans 402 within a compute device 102 have a multivariate normal distribution with mean fan speed vector $\overline{X}=(\overline{X}_1, \overline{X}_2, \ldots \overline{X}_n)$ and covariance matrix $S=1/n-1\Sigma_{i=1}^{n}(\overline{X}_i-\overline{X})(\overline{X}_i-\overline{X})'$. These statistical values can be stored and used to determine whether a fan speed is in a normal range, as discussed in more detail below.

Additionally or alternatively, in some embodiments, the fan performance classification training module 616 trains a naïve Bayesian classifier. The naïve Bayesian classifier can be trained using fan speeds corresponding to a compute device 102 that are grouped according to which fan 402 of the compute device 102 the speeds are associated with.

The fan performance classification module 618, which may be embodied as hardware (e.g., circuitry), firmware, software, virtualized hardware, emulated architecture, and/or a combination thereof as discussed above, is configured to determine a likelihood of failure of a fan 402 of a compute device 102. The fan performance classification module 618 may use telemetry data of fan speeds received from a compute device 102. The fan speeds may be from fans 402 in one or more compute devices 102. The fan speeds may be instantaneous measurements or may be averages over some amount of time, such as five minutes. The fan speeds may be sampled continuously, continually, or periodically, such as every 1-20 minutes. In the illustrative embodiment the fan speeds are sampled every five minutes. In some embodiments, the fan performance classification module 618 may preprocess the telemetry data. The fan performance classification module 618 may remove any irrelevant or redundant data. The fan performance classification module 618 analyzes the telemetry data with use of an algorithm and the algorithm parameters determined by the fan performance classification training module 616. The fan performance classification module 618 may analyze the telemetry data with any suitable algorithm, such as a statistical model or a machine-learning-based algorithm.

In the illustrative embodiment, the fan performance classification module 618 may analyze the telemetry data with a statistical model. The fan performance classification module 618 may calculate Hotelling's t-squared statistic using the formula $T^2=(X_i-\overline{X})'S^{-1}(\overline{X}_i-\overline{X})$ and the F-distribution $$F = \frac{n-p}{p(n-1)}T^2,$$

where n is the number of fan speed samples and p is the mean value of the fan speed samples, and $\overline{X}_i$, $\overline{X}$, and S are as defined above in regard to the fan performance classification training module 616. If the $T^2$ statistical value is greater than the F value, the fan speed is normal. If the $T^2$ statistical value is less than the F value, the fan speed may be anomalous. The fan performance classification module 618 may have predefined thresholds for how much less the $T^2$ statistical value is than the F value for classifying the fan speed. For example, past a first threshold, the fan speed may be labeled as a warning. Past a second threshold, the fan speed may be labeled as a minor problem. Past a third threshold, the fan speed may be labeled as a major problem. Past a fourth threshold, the fan speed may be labeled as critical.

In some embodiments, the fan performance classification module 618 may analyze the telemetry data with a naïve Bayesian classifier. The naïve Bayesian classifier can be applied using fan speeds corresponding to a compute device 102 that are grouped according to which fan 402 of the compute device 102 the speeds are associated with.

The fan performance classification module 618 may also determine whether an action should be taken to mitigate the impact of a failure of the fan 402 based on the output of the statistical model or other algorithm. For example, the fan performance classification module 618 may have a predetermined threshold for how much less the $T^2$ statistical value must be than the F value in order to take some action. If the fan performance classification module 618 determines that action should be taken, the fan performance classification module 618 takes action to mitigate the impact of a failure of a fan 402 of the compute device 102. For example, the fan performance classification module 618 may migrate some or all of the workload of the compute device 102 to a new compute device 102. In some embodiments, the fan performance classification module 618 may alert an administrator of the system 100, who can then manually replace the fan 402.

The communication engine 620 is configured to control the communication circuitry 312. The communication engine 620 processes incoming messages from other compute devices 102 as well as instructions from the orchestration system 104 and outgoing messages from the orchestration system 104. The communication engine 620 may be configured to use any one or more communication technology and associated protocols (e.g., Ethernet, Bluetooth®, Wi-Fi®, WiMAX, near field communication (NFC), etc.). In the illustrative embodiment, the communication engine 620 receives telemetry data from to the compute devices 102.

Figure 7:
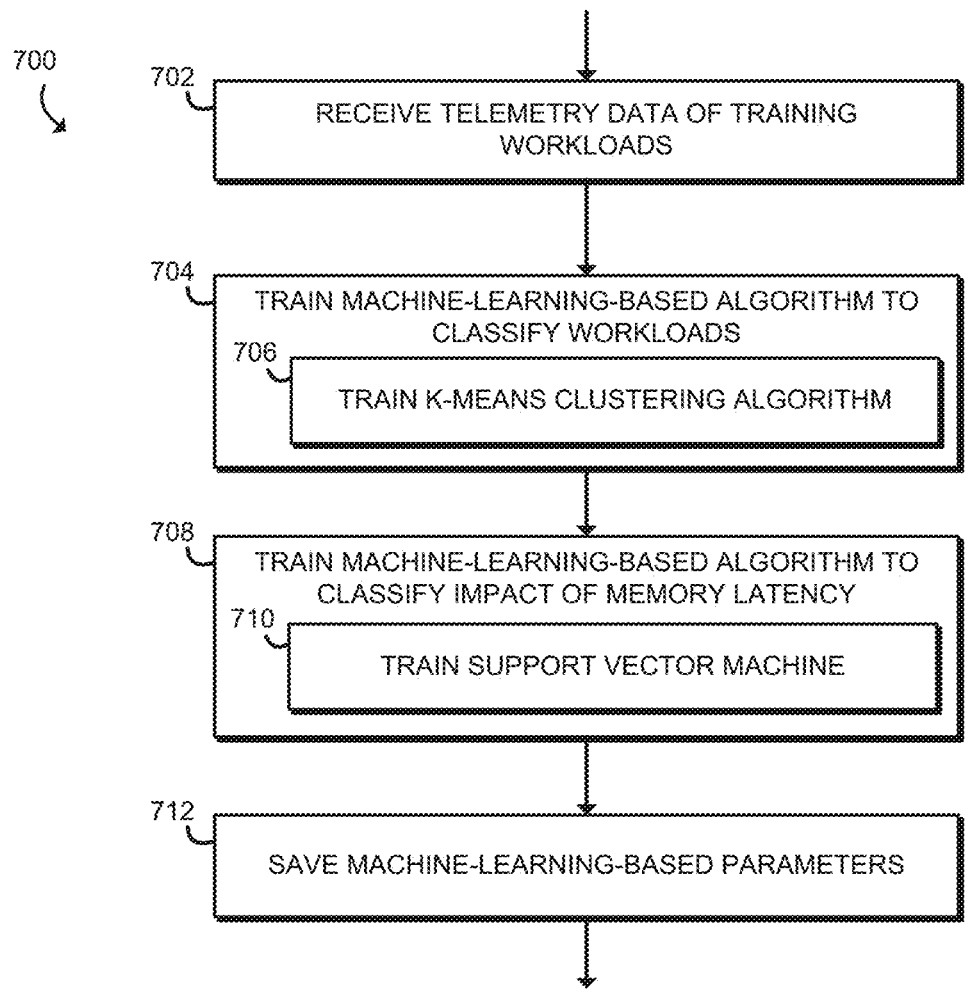
FIG. 7 is a simplified flow diagram of at least one embodiment of a method for training machine-learning-based algorithms for classifying an impact of memory latency of workloads that may be executed by the orchestration system of FIG. 3.

Referring now to FIG. 7, in use, the orchestration system 104 may execute a method 700 for training a workload classification machine-learning-based algorithm. The method 700 begins in block 702, in which the orchestration system 104 receives telemetry data of training workloads from a compute device 102. The telemetry data may include, e.g., processor utilization, cache utilization, a number or rate of cache misses, memory allocation utilization, memory bandwidth, a number or rate of correctable errors, a number or rate of uncorrectable errors, and a rate of network traffic flow. It should be appreciated that, as described above, the orchestration system 104 may be part of the compute device 102, in which case the orchestration system 104 may receive telemetry data of training workloads directly from, e.g., the telemetry circuitry 208.

In block 704, the orchestration system 104 trains a machine-learning-based algorithm to classify workloads. The orchestration system 104 may use some or all of the telemetry data such as processor utilization, cache utilization, a number or rate of cache misses, memory allocation utilization, memory bandwidth, a number or rate of correctable errors, a number or rate of uncorrectable errors, and a rate of network traffic flow to train the machine-learning-based algorithm. In the illustrative embodiment, the orchestration system 104 trains a k-means clustering algorithm in block 706.

In block 708, the orchestration system 104 trains a machine-learning-based algorithm for classification of an impact of memory latency. The latency of the memory 204 may be impacted from any number of causes, such as saturation of the memory bandwidth, degradation or failure of a memory device 214, etc. The impact of the latency of the memory 204 may affect various aspects of the performance of the workload, such as a shift in the probability density function (PDF) of execution time of workloads. The amount of the shift may be correlated with various factors, such as the telemetry data gathered during execution of the workload or the classification of the workload. For example, one workload may not be significantly impacted by a slight or moderate increase in memory latency while a different workload might be significantly impacted by even a slight increase in memory latency. The orchestration system 104 may train a machine-learning-based algorithm using input such as processor utilization, cache utilization, a number or rate of cache misses, time to execute a workload or task, memory allocation utilization, memory bandwidth, a number or rate of correctable errors, a number or rate of uncorrectable errors, and an amount of swap memory used. In some embodiments, the orchestration system 104 may train a machine-learning-based algorithm using labeled training data that indicates how the telemetry data associated with a particular training workload should be classified. The orchestration system 104 may train any suitable machine-learning-based algorithm. In the illustrative embodiment, the orchestration system 104 trains a support vector machine in block 710. The illustrative support vector machine has four classifications. The four illustrative classifications indicate that the impact of memory latency is (i) normal, (ii) shifting towards performance impacts, such as small shifts in the peak of the probability density function (PDF) of task completion times and introduction of increase of errors in the memory's error correcting codes (ECC), (iii) shifting towards more significant performance impacts through shifts in the PDF of task completion times, significant increase in ECC errors, and changes in resource utilization, and (iv) abnormal, such as abnormal utilization with no impacts on performance or occurrence of ECC errors.

In block 712, the orchestration system 104 saves parameters for the machine-learning-based algorithm in the machine-learning-based algorithm parameter database 622. In some embodiments, the orchestration system 104 may train several machine-learning-based algorithms for different environments and save that parameters for each of the machine-learning-based algorithm.

Figure 8:
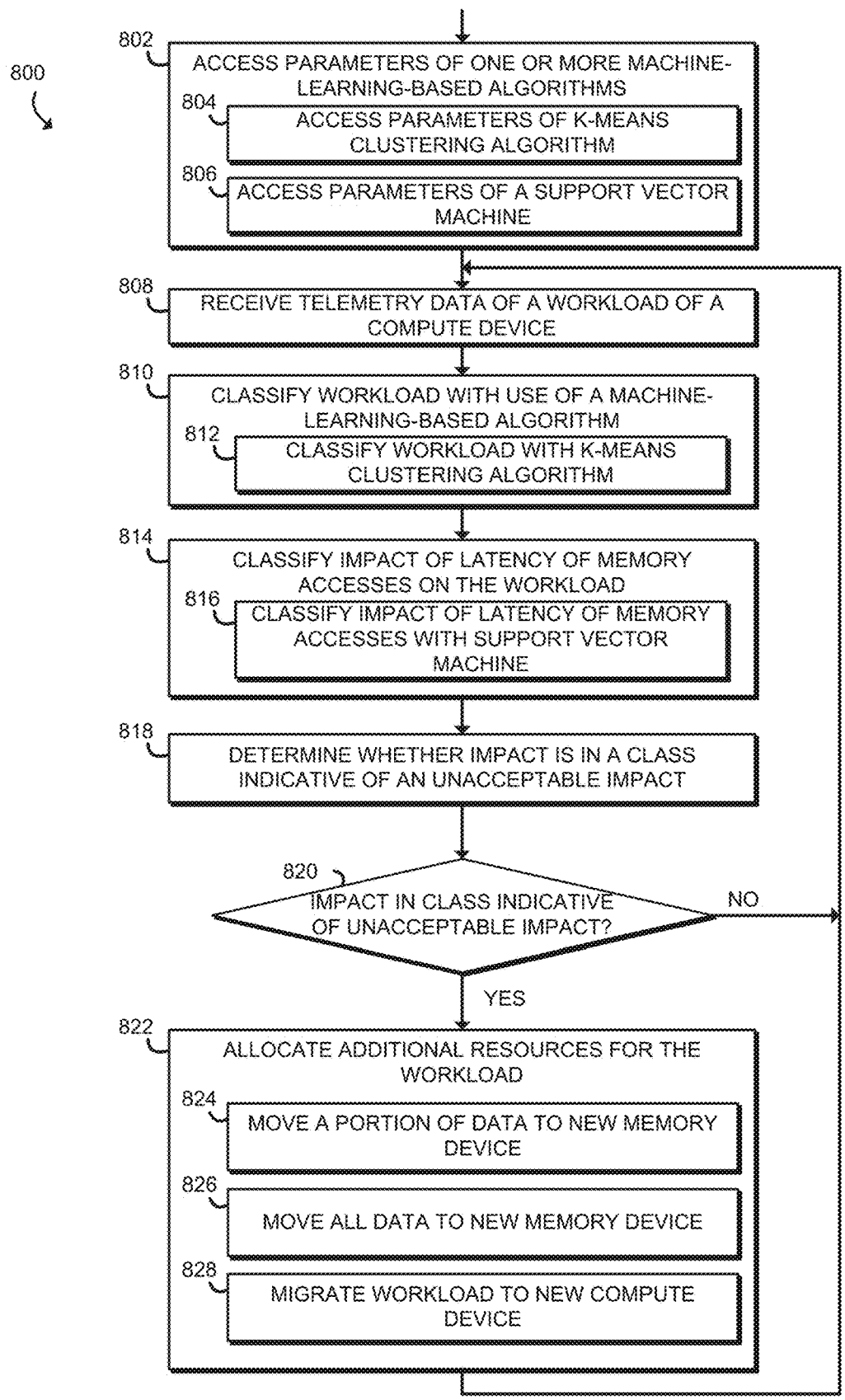
FIG. 8 is a simplified flow diagram of at least one embodiment of a method for performing a machine-learning-based algorithms for classifying an impact of memory latency of workloads that may be executed by the orchestration system of FIG. 3.

Referring now to FIG. 8, in use, the orchestration system 104 may execute a method 800 for performing a workload classification machine-learning-based algorithm. The method 800 begins in block 802, in which the orchestration system 104 accesses parameters of one or more machine-learning based algorithms. In the illustrative embodiment, the orchestration system 104 accesses parameters of a k-means clustering algorithm in block 804 that can be used to classify workloads. The illustrative orchestration system 104 may also access parameters of a support vector machine that can be used to determine an impact of a latency of memory accesses in block 806.

In block 808, the orchestration system 104 receives telemetry data of a workload of a compute device 102. The telemetry data may include any suitable data, such as processor utilization, cache utilization, a number or rate of cache misses, time to execute a workload or task, memory allocation utilization, memory bandwidth, a number or rate of correctable errors, a number or rate of uncorrectable errors, an amount of swap memory used, and a rate of network traffic flow.

In block 810, the orchestration system 104 classifies the current workload of the compute device 102 with a machine-learning-based algorithm using the telemetry data. To do so, the orchestration system 104 may use telemetry data such as processor utilization, cache utilization, a number or rate of cache misses, memory allocation utilization, memory bandwidth, a number or rate of correctable errors, a number or rate of uncorrectable errors, and a rate of network traffic flow. In the illustrative embodiment, the orchestration system 104 classifies the current workload with a k-means clustering algorithm in block 812.

In block 814, the orchestration system 104 classifies an impact of the latency of memory access on the current workload with a machine-learning-based algorithm using the telemetry data. To do so, the orchestration system 104 may use telemetry data such as processor utilization, cache utilization, a number or rate of cache misses, time to execute a workload or task, memory allocation utilization, memory bandwidth, a number or rate of correctable errors, a number or rate of uncorrectable errors, and an amount of swap memory use. In the illustrative embodiment, the orchestration system 104 classifies the impact of the latency of memory accesses on the current workload using a support vector machine in block 816.

In block 818, the orchestration system 104 determines whether the classified impact of the latency of memory accesses on the current workload is in a class indicative of an unacceptable impact. In the illustrative embodiment, the classifications which indicate an unacceptable impact are pre-determined, such as the classifications that indicate a small or significant shifts in performance due to the latency. Which classifications indicate an unacceptable impact may depend on the embodiment. For example, in some embodiments, an indication of a small shift in performance may not indicate unacceptable performance. In some embodiments, whether a classification indicates unacceptable performance may depend on a service level agreement (SLA) that should be followed.

In block 820, if the orchestration system 104 determines that the impact is not in a class indicative of an unacceptable impact, the method 800 loops back to block 808 to continue to receive telemetry data. If the orchestration system 104 determines that the impact is in a class indicative of an unacceptable impact, the method 800 proceeds to block 822, in which the orchestration system 104 allocates additional resources for the workload. For example, the orchestration system 104 may move a portion of the data to a new memory device 214 in block 824, which may increase the amount of available memory bandwidth. The orchestration system 104 may also move all of the data to a new memory device 214 in block 826, which may alleviate problems related to a failing memory device 214. The orchestration system 104 may additionally migrate the workload to a new compute device 104 that will have better performance in block 828. The method 800 then loops back to block 808 to continue to receive telemetry data.

Figure 9:
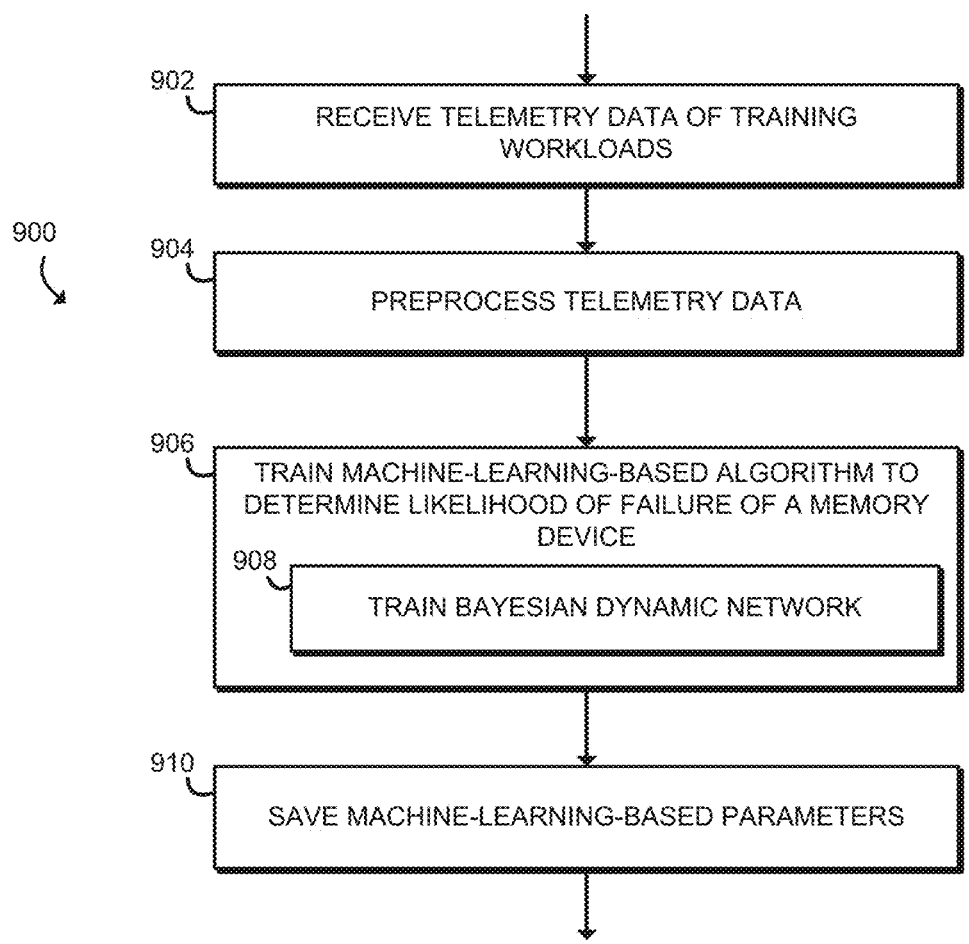
FIG. 9 is a simplified flow diagram of at least one embodiment of a method for training machine-learning-based algorithms for determining a likelihood of failure of a memory device that may be executed by the orchestration system of FIG. 3.

Referring now to FIG. 9, in use, the orchestration system 104 may execute a method 900 for training a machine-learning-based algorithm to determine a likelihood of failure of a memory device 214. The method 900 begins in block 902, in which the orchestration system 104 receives telemetry data of training workloads from a compute device 102. The telemetry data may include, e.g., processor utilization, cache utilization, a number or rate of cache misses, memory allocation utilization, memory bandwidth, a number or rate of correctable errors, a number or rate of uncorrectable errors, a temperature of components such as the processor 202 and/or memory devices 214, and instructions per second.

In block 904, in some embodiments, the orchestration system 104 preprocesses the telemetry data. The orchestration system 104 may remove any irrelevant or redundant data and use a learning vector quantization classifier to classify the data. The correlation for the data may be computed, and the data may be regrouped according to the correlation coefficient before further processing.

In block 906, the orchestration system 104 trains a machine-learning-based algorithm for determination of a likelihood of failure of a memory device 214. The likelihood of failure may depend on any number of factors, such as processor utilization, memory bandwidth utilization, memory temperature, etc. In the illustrative embodiment, the parameters used in the machine-learning-based algorithm are (i) processor utilization, (ii) cache utilization, (iii) memory utilization, (iv) correctable errors, (v) memory temperature, (vi) instructions per second, and (vii) memory bandwidth. In some embodiments, the orchestration system 104 may train a machine-learning-based algorithm using labeled training data that indicates how likely it is that a memory device 214 will fail. The output of the machine-learning-based algorithm provides an indication of a failure likelihood of a memory device 214. The output may be a classification into a certain range of likelihood or the output may be, e.g., a single parameter that may be compared to a threshold.

In the illustrative embodiment, the orchestration system 104 trains a Bayesian dynamic network in block 908 to determine a relationship between features over time. For example, processor utilization at one time step may be mapped to processor utilization, memory utilization, and memory bandwidth at the next time step. Similarly, memory utilization at one time step may be mapped to memory bandwidth, memory utilization, and memory temperature at the next time step. The Bayesian dynamic network may be configured with any combination of features at one time step being mapped to any combination of features at the next time step. In the illustrative embodiment, the Bayesian dynamic network provides a single output parameter indicative of a likelihood of failure of a memory device 214.

In block 910, the orchestration system 104 saves parameters for the machine-learning-based algorithm in the machine-learning-based algorithm parameter database 622. In some embodiments, the orchestration system 104 may train several machine-learning-based algorithms for different environments and save that parameters for each of the machine-learning-based algorithm.

Figure 10:
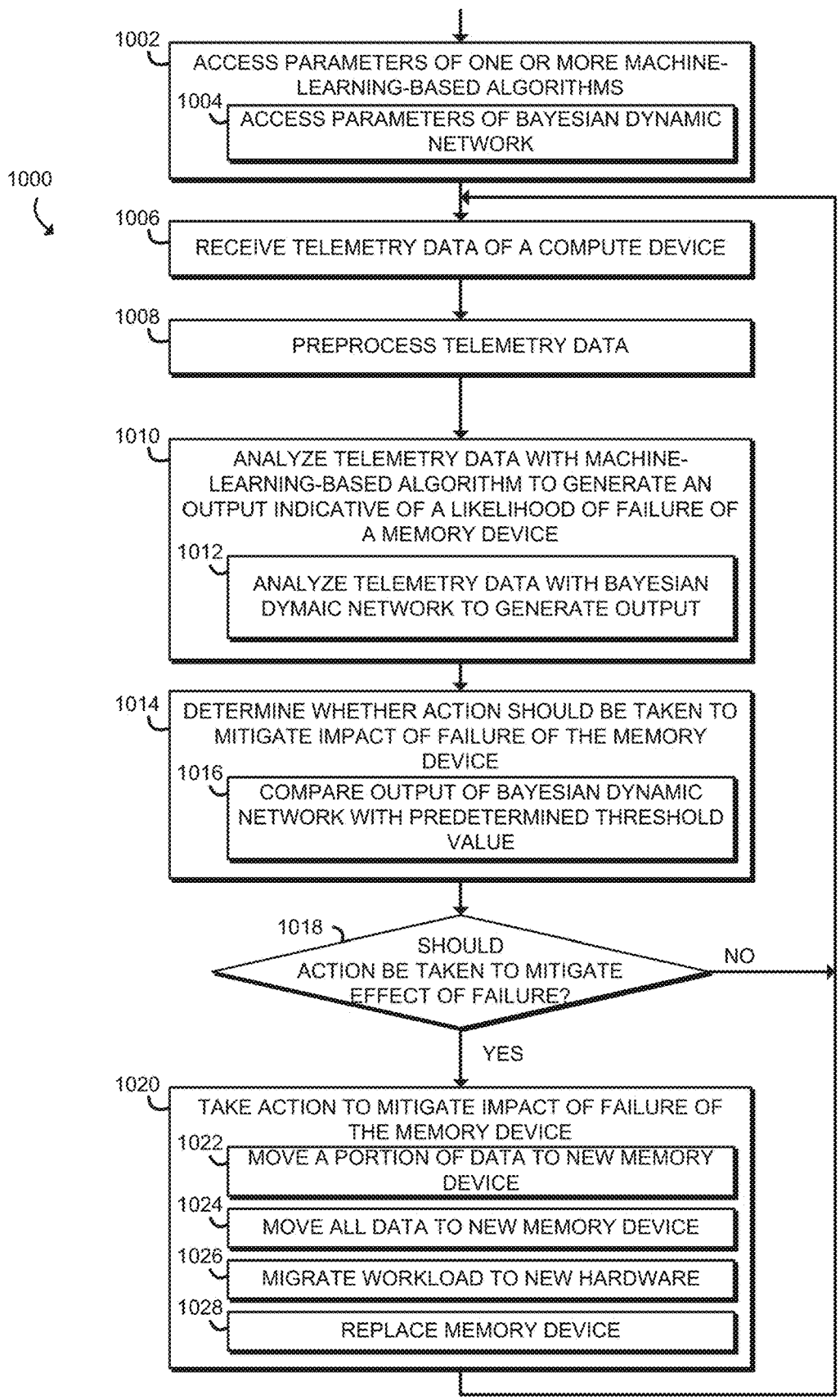
FIG. 10 is a simplified flow diagram of at least one embodiment of a method for performing a machine-learning-based algorithms for determining a likelihood of failure of a memory device that may be executed by the orchestration system of FIG. 3.

Referring now to FIG. 10, in use, the orchestration system 104 may execute a method 1000 for performing a machinelearning-based algorithm for determination of a likelihood of failure of a memory device 214. The method 1000 begins in block 1002, in which the orchestration system 104 accesses parameters of one or more machine-learning based algorithms. In the illustrative embodiment, the orchestration system 104 accesses parameters of a Bayesian dynamic network in block 1004 that can be used to determine a likelihood of failure of a memory device 214.

In block 1006, the orchestration system 104 receives telemetry data of a compute device 102. The telemetry data may include any suitable data, such as processor utilization, memory bandwidth utilization, memory temperature, etc. In the illustrative embodiment, the parameters received are (i) processor utilization, (ii) cache utilization, (iii) memory utilization, (iv) correctable errors, (v) memory temperature, (vi) instructions per second, and (vii) memory bandwidth.

In block 1008, in some embodiments, the orchestration system 104 preprocesses the telemetry data. The orchestration system 104 may remove any irrelevant or redundant data and use a learning vector quantization classifier to classify the data. The correlation for the data may be computed, and the data may be regrouped according to the correlation coefficient before further processing.

In block 1010, the orchestration system 104 analyzes the telemetry data with a machine-learning-based algorithm to generate an output indicative of a likelihood of failure of a memory device 214 of the compute device 102. To do so, the orchestration system 104 may use telemetry data such as processor utilization, memory bandwidth utilization, memory temperature. In the illustrative embodiment, the orchestration system 104 uses a Bayesian dynamic network in block 1012, using as input (i) processor utilization, (ii) cache utilization, (iii) memory utilization, (iv) correctable errors, (v) memory temperature, (vi) instructions per second, and (vii) memory bandwidth. In the illustrative embodiment, the output of the Bayesian dynamic network is a single value that can be compared to a threshold.

In block 1014, the orchestration system 104 determines whether an action should be taken to mitigate the impact of a failure of the memory device 214 based on the output of the machine-learning-based algorithm. In block 1016, the orchestration system 104 compares an output of the Bayesian dynamic network with a predetermined threshold to determine whether action should be taken.

In block 1018, if the orchestration system 104 determines that action should not be taken, the method 1000 loops back to block 1006 to continue to receive telemetry data. If the orchestration system 104 determines that action should be taken, the method 1000 proceeds to block 1020, in which the orchestration system 104 takes action to mitigate the impact of a failure of a memory device 214. For example, the orchestration system 104 may move a portion of the data to a new memory device 214 in block 1022, which may reduce the impact of more errors in memory. The orchestration system 104 may also move all of the data to a new memory device 214 in block 1024, which may alleviate problems related to a failing memory device 214. The orchestration system 104 may additionally migrate the workload to a new compute device 104 that will have better performance in block 1026. In some embodiments, an administrator of the system 100 may replace the failing memory device 214 in block 1028. The method 1000 then loops back to block 1006 to continue to receive telemetry data.

Figure 11:
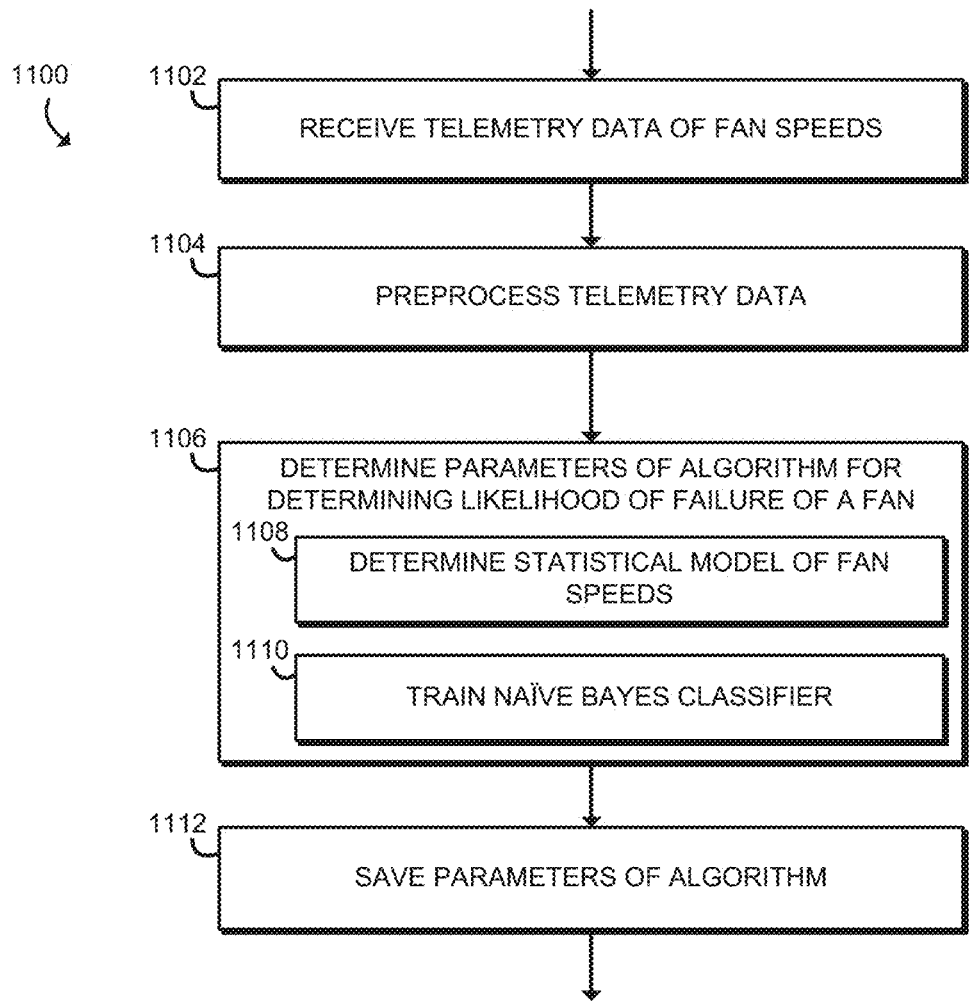
FIG. 11 is a simplified flow diagram of at least one embodiment of a method for training algorithms for determining a likelihood of failure of a fan of a compute device that may be executed by the orchestration system of FIG. 3.

Referring now to FIG. 11, in use, the orchestration system 104 may execute a method 1100 for determining parameters for an algorithm to determine a likelihood of failure of a fan 402 of a compute device 102. The method 1100 begins in block 1102, in which the orchestration system 104 receives telemetry data of fan speeds from a compute device 102. The fan speeds may be from fans 402 in one or more compute devices 102. The fan speeds may be instantaneous measurements or may be averages over some amount of time, such as five minutes. The fan speeds may be sampled continuously, continually, or periodically, such as every 1-20 minutes. In the illustrative embodiment the fan speeds are sampled every five minutes.

In block 1104, in some embodiments, the orchestration system 104 preprocesses the telemetry data. The orchestration system 104 may remove any irrelevant or redundant data.

In block 1106, the orchestration system 104 determines parameters of an algorithm for determining the likelihood of failure of a fan 402. The orchestration system 104 may use any suitable algorithm for determining the likelihood of failure of a fan 402, such as a statistical model or a machine-learning-based algorithm.

In the illustrative embodiment, the orchestration system 104 determines a statistical model of fan speeds in block 1108. The fan speeds may correspond to a compute device 102 and be grouped according to which fan 402 of the compute device 102 the speeds are associated with. The fan speeds of n fans 402 of a compute device 102 at a given time may be represented by a vector $X=\{x_1, x_2, \ldots x_n\}$, where $x_n$ is the speed for fan n. Each fan n has an average speed $\overline{X}_n$ and standard deviation c. Similarly, the speeds of multiple fans 402 within a compute device 102 have a multivariate normal distribution with mean $\overline{X}=(\overline{X}_1, \overline{X}_2, \ldots \overline{X}_n)$ and covariance matrix $S=1/n-1\Sigma_{i=1}^{n}(\overline{X}_i-\overline{X})(\overline{X}_i-\overline{X})'$. These statistical values can be stored and used to determine whether a fan speed is in a normal range, as discussed in more detail below.

Additionally or alternatively, in some embodiments, the orchestration system 104 trains a naïve Bayesian classifier in block 1110. The naïve Bayesian classifier can be trained using fan speeds corresponding to a compute device 102 that are grouped according to which fan 402 of the compute device 102 the speeds are associated with.

In block 1112, the orchestration system 104 saves parameters for the algorithm in the machine-learning-based algorithm parameter database 622. In some embodiments, the orchestration system 104 may train several machine-learning-based algorithms for different environments, such as compute devices 102 which different fan configurations, and save that parameters for each of the machine-learning-based algorithm.

Figure 12:
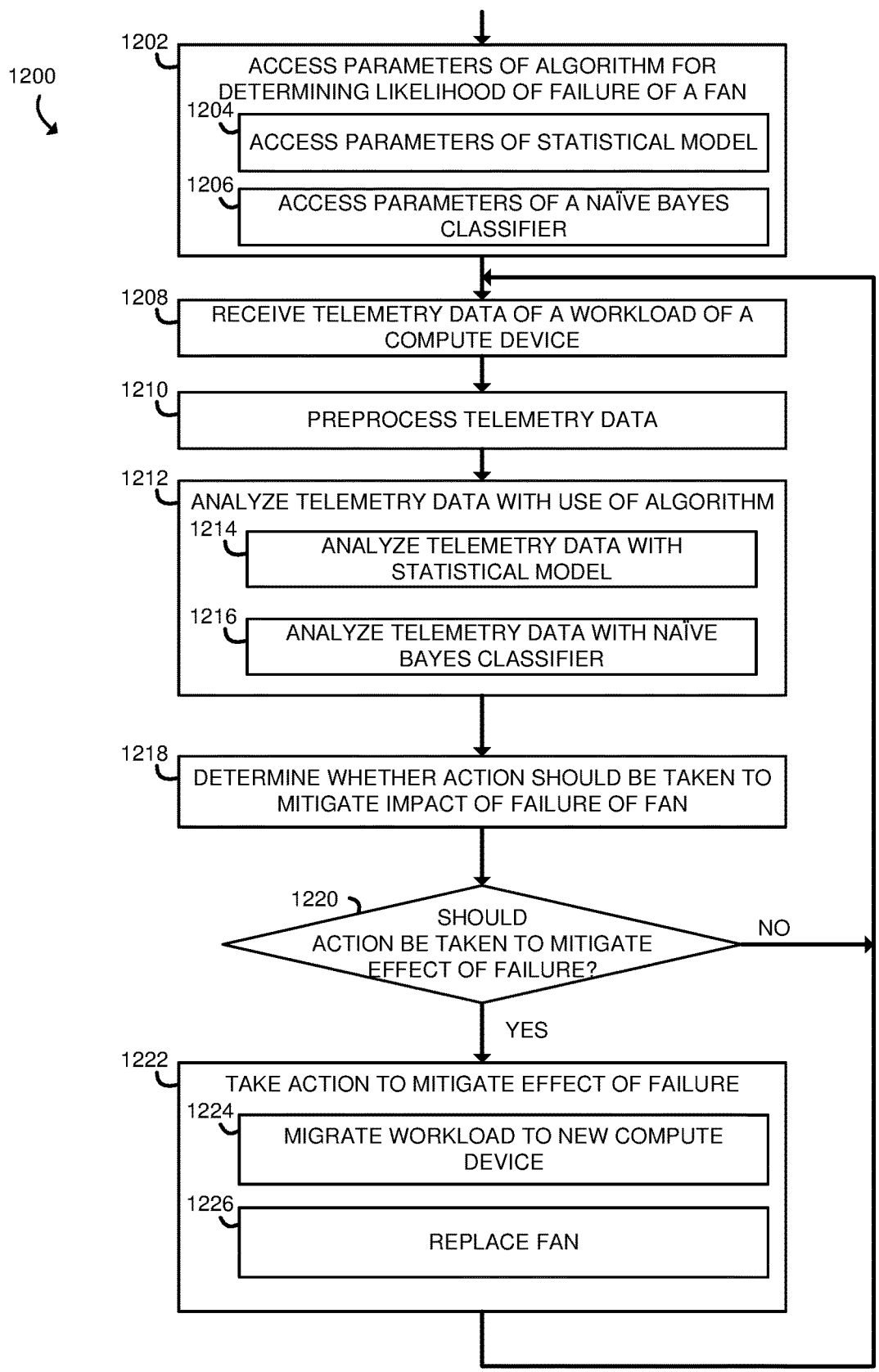
FIG. 12 is a simplified flow diagram of at least one embodiment of a method for performing an algorithm for determining a likelihood of failure of a fan of a compute device that may be executed by the orchestration system of FIG. 3.

Referring now to FIG. 12, in use, the orchestration system 104 may execute a method 1200 for performing an algorithm for determination of a likelihood of failure of a fan 402 of a compute device 102. The method 1200 begins in block 1202, in which the orchestration system 104 accesses parameters of one or more algorithms. In the illustrative embodiment, the orchestration system 104 accesses parameters of a statistical model in block 1204. Additionally or alternatively, the orchestration system 104 may access parameters of a naïve Bayesian classifier in block 1206.

In block 1208, the orchestration system 104 receives telemetry data of fan speeds from a compute device 102. The fan speeds may be from fans 402 in one or more compute devices 102. The fan speeds may be instantaneous measurements or may be averages over some amount of time, such as five minutes. The fan speeds may be sampled continuously, continually, or periodically, such as every 1-20 minutes. In the illustrative embodiment the fan speeds are sampled every five minutes.

In block 1210, in some embodiments, the orchestration system 104 preprocesses the telemetry data. The orchestration system 104 may remove any irrelevant or redundant data.

In block 1212, the orchestration system 104 analyzes the telemetry data with use of an algorithm and the algorithm parameters that were accessed in block 1202. The orchestration system 104 may analyze the telemetry data with any suitable algorithm, such as a statistical model or a machine-learning-based algorithm.

In the illustrative embodiment, the orchestration system 104 may analyze the telemetry data with a statistical model in block 1214. The orchestration system 104 may calculate Hotelling's t-squared statistic using the formula $T^2=(X_i-\overline{X})'S^{-1}(X_i-\overline{X})$ and the F-distribution $$F = \frac{n-p}{p(n-1)}T^2,$$

where n is the number of fan speed samples and p is the mean value of the fan speed samples. If the $T^2$ statistical value is greater than the F value, the fan speed is normal. If the $T^2$ statistical value is less than the F value, the fan speed may be anomalous. The orchestration system 104 may have predefined thresholds for how much less the $T^2$ statistical value is than the F value for classifying the fan speed. For example, past a first threshold, the fan speed may be labeled as a warning. Past a second threshold, the fan speed may be labeled as a minor problem. Past a third threshold, the fan speed may be labeled as a major problem. Past a fourth threshold, the fan speed may be labeled as critical.

In some embodiments, the orchestration system 104 may analyze the telemetry data with a naïve Bayesian classifier in block 1216. The naïve Bayesian classifier can be applied using fan speeds corresponding to a compute device 102 that are grouped according to which fan 402 of the compute device 102 the speeds are associated with.

In block 1218, the orchestration system 104 determines whether an action should be taken to mitigate the impact of a failure of the fan 402 based on the output of the statistical model or other algorithm. For example, the orchestration system 104 may have a predetermined threshold for how much less the $T^2$ statistical value must be than the F value in order to take some action.

In block 1220, if the orchestration system 104 determines that action should not be taken, the method 1200 loops back to block 1208 to continue to receive telemetry data. If the orchestration system 104 determines that action should be taken, the method 1200 proceeds to block 1222, in which the orchestration system 104 takes action to mitigate the impact of a failure of a fan 402 of the compute device 102. For example, the orchestration system 104 may migrate some or all of the workload of the compute device 102 to a new compute device 102 in block 1224. In some embodiments, the orchestration system 104 may alert an administrator of the system 100 in block 1226, who can then manually replace the fan 402. The method 1200 then loops back to block 1208 to continue to receive telemetry data.

Examples

Illustrative examples of the devices, systems, and methods disclosed herein are provided below. An embodiment of the devices, systems, and methods may include any one or more, and any combination of, the examples described below.

Example 1 includes an orchestration system for managing impact of memory latency of a compute device, the orchestration system comprising memory latency impact classification circuitry to access parameters of a machine-learning-based algorithm; receive telemetry data of the compute device; classify, with use of the parameters of the machine-learning-based algorithm, an impact of a latency of memory accesses on a workload of the compute device; and determine whether the impact of the latency of memory accesses on the workload is in a class indicative of an unacceptable impact; and workload allocation circuitry to allocate, in response to a determination that the impact of the latency of memory accesses on the workload is in the class indicative of an unacceptable impact, additional resources for the workload on the compute device.

Example 2 includes the subject matter of Example 1, and further including workload classification circuitry to classify the workload of the compute device, wherein to classify, with use of the parameters of the machine-learning-based algorithm, the impact of the latency of memory accesses on the workload of the compute device comprises to classifying, based on the classification of the workload of the compute device, the impact of the latency of memory accesses on the workload of the compute device.

Example 3 includes the subject matter of any of Examples 1 and 2, and wherein to classify the workload of the compute device comprises to classify, with use of a k-means clustering algorithm, the workload of the compute device.

Example 4 includes the subject matter of any of Examples 1-3, and further including workload classification training circuitry to access telemetry data of training workloads; train, with use of the telemetry data of the training workloads, the k-means clustering algorithm; and save parameters of the k-means clustering algorithm on the orchestration system.

Example 5 includes the subject matter of any of Examples 1-4, and wherein the telemetry data comprises network utilization data, swap utilization data, memory utilization data, cache utilization data, and processor utilization data, wherein to classify the workload of the compute device comprises to classify the workload of the compute device based on the network utilization data, the swap utilization data, the memory utilization data, the cache utilization data, and the processor utilization data.

Example 6 includes the subject matter of any of Examples 1-5, and wherein to classify, with use of the parameters of the machine-learning-based algorithm, the impact of the latency of memory accesses on the workload of the compute device comprises to classify, with use of a support vector machine, the impact of the latency of memory accesses on the workload of the compute device.

Example 7 includes the subject matter of any of Examples 1-6, and further including memory performance classification training circuitry access telemetry data of training workloads; train, with use of the telemetry data of the training workloads, the support vector machine.

Example 8 includes the subject matter of any of Examples 1-7, and wherein the telemetry data comprises processor utilization, cache utilization, a number or rate of cache misses, time to execute a workload or task, memory allocation utilization, memory bandwidth, a number or rate of correctable errors, a number or rate of uncorrectable errors, and an amount of swap memory used, wherein to classify, with use of the parameters of the machine-learning-based algorithm, an impact of a latency of memory accesses on a workload of the compute device based on the processor utilization, the cache utilization, the number or rate of cache misses, the time to execute a workload or task, the memory allocation utilization, the memory bandwidth, the number or rate of correctable errors, the number or rate of uncorrectable errors, and the amount of swap memory used.

Example 9 includes the subject matter of any of Examples 1-8, and wherein to allocate, in response to the determination that the impact of the latency of memory accesses on the workload is in the class indicative of an unacceptable impact, the additional resources for the workload on the compute device comprises to move, in response to the determination that the impact of the latency of memory accesses on the workload is in the class indicative of an unacceptable impact, a portion of the data in a first memory device of the compute device to a second memory device of the compute device.

Example 10 includes the subject matter of any of Examples 1-9, and wherein to allocate, in response to the determination that the impact of the latency of memory accesses on the workload is in the class indicative of an unacceptable impact, the additional resources for the workload on the compute device comprises to move, in response to the determination that the impact of the latency of memory accesses on the workload is in the class indicative of an unacceptable impact, all of the data associated with the workload in a first memory device of the compute device to a second memory device of the compute device.

Example 11 includes a method for managing impact of memory latency of a compute device, the method comprising accessing, by an orchestration system, parameters of a machine-learning-based algorithm; receiving, by the orchestration system, telemetry data of the compute device; classifying, by the orchestration system and with use of the parameters of the machine-learning-based algorithm, an impact of a latency of memory accesses on a workload of the compute device; determining, by the orchestration system, whether the impact of the latency of memory accesses on the workload is in a class indicative of an unacceptable impact; and allocating, by the orchestration system and in response to a determination that the impact of the latency of memory accesses on the workload is in the class indicative of an unacceptable impact, additional resources for the workload on the compute device.

Example 12 includes the subject matter of Example 11, and further including classifying, by the orchestration system, the workload of the compute device, wherein classifying, by the orchestration system and with use of the parameters of the machine-learning-based algorithm, the impact of the latency of memory accesses on the workload of the compute device comprises classifying, by the orchestration system and based on the classification of the workload of the compute device, the impact of the latency of memory accesses on the workload of the compute device.

Example 13 includes the subject matter of any of Examples 11 and 12, and wherein classifying, by the orchestration system, the workload of the compute device comprises classifying, by the orchestration system and with use of a k-means clustering algorithm, the workload of the compute device.

Example 14 includes the subject matter of any of Examples 11-13, and further including accessing, by the orchestration system, telemetry data of training workloads; training, by the orchestration system and with use of the telemetry data of the training workloads, the k-means clustering algorithm; and saving, by the orchestration system, parameters of the k-means clustering algorithm on the orchestration system.

Example 15 includes the subject matter of any of Examples 11-14, and wherein the telemetry data comprises network utilization data, swap utilization data, memory utilization data, cache utilization data, and processor utilization data, wherein classifying, by the orchestration system, the workload of the compute device comprises classifying, by the orchestration system, the workload of the compute device based on the network utilization data, the swap utilization data, the memory utilization data, the cache utilization data, and the processor utilization data.

Example 16 includes the subject matter of any of Examples 11-15, and wherein classifying, by the orchestration system and with use of the parameters of the machine-learning-based algorithm, the impact of the latency of memory accesses on the workload of the compute device comprises classifying, by the orchestration system and with use of a support vector machine, the impact of the latency of memory accesses on the workload of the compute device.

Example 17 includes the subject matter of any of Examples 11-16, and further including accessing, by the orchestration system, telemetry data of training workloads; training, by the orchestration system and with use of the telemetry data of the training workloads, the support vector machine.

Example 18 includes the subject matter of any of Examples 11-17, and wherein the telemetry data comprises processor utilization, cache utilization, a number or rate of cache misses, time to execute a workload or task, memory allocation utilization, memory bandwidth, a number or rate of correctable errors, a number or rate of uncorrectable errors, and an amount of swap memory used, wherein classifying, by the orchestration system and with use of the parameters of the machine-learning-based algorithm, an impact of a latency of memory accesses on a workload of the compute device based on the processor utilization, the cache utilization, the number or rate of cache misses, the time to execute a workload or task, the memory allocation utilization, the memory bandwidth, the number or rate of correctable errors, the number or rate of uncorrectable errors, and the amount of swap memory used.

Example 19 includes the subject matter of any of Examples 11-18, and wherein allocating, by the orchestration system and in response to the determination that the impact of the latency of memory accesses on the workload is in the class indicative of an unacceptable impact, the additional resources for the workload on the compute device comprises moving, by the orchestration system and in response to the determination that the impact of the latency of memory accesses on the workload is in the class indicative of an unacceptable impact, a portion of the data in a first memory device of the compute device to a second memory device of the compute device.

Example 20 includes the subject matter of any of Examples 11-19, and wherein allocating, by the orchestration system and in response to the determination that the impact of the latency of memory accesses on the workload is in the class indicative of an unacceptable impact, the additional resources for the workload on the compute device comprises moving, by the orchestration system and in response to the determination that the impact of the latency of memory accesses on the workload is in the class indicative of an unacceptable impact, all of the data associated with the workload in a first memory device of the compute device to a second memory device of the compute device.

Example 21 includes one or more computer-readable media comprising a plurality of instructions stored thereon that, when executed, causes an orchestration system to access parameters of a machine-learning-based algorithm; receive telemetry data of a compute device; classify, with use of the parameters of the machine-learning-based algorithm, an impact of a latency of memory accesses on a workload of the compute device; determine whether the impact of the latency of memory accesses on the workload is in a class indicative of an unacceptable impact; and allocate, in response to a determination that the impact of the latency of memory accesses on the workload is in the class indicative of an unacceptable impact, additional resources for the workload on the compute device.

Example 22 includes the subject matter of Example 21, and wherein the plurality of instructions further cause the orchestration system to classify the workload of the compute device, wherein to classify, with use of the parameters of the machine-learning-based algorithm, the impact of the latency of memory accesses on the workload of the compute device comprises to classifying, based on the classification of the workload of the compute device, the impact of the latency of memory accesses on the workload of the compute device.

Example 23 includes the subject matter of any of Examples 21 and 22, and wherein to classify the workload of the compute device comprises to classify, with use of a k-means clustering algorithm, the workload of the compute device.

Example 24 includes the subject matter of any of Examples 21-23, and wherein the plurality of instructions further cause the orchestration system to access telemetry data of training workloads; train, with use of the telemetry data of the training workloads, the k-means clustering algorithm; and save parameters of the k-means clustering algorithm on the orchestration system.

Example 25 includes the subject matter of any of Examples 21-24, and wherein the telemetry data comprises network utilization data, swap utilization data, memory utilization data, cache utilization data, and processor utilization data, wherein to classify the workload of the compute device comprises to classify the workload of the compute device based on the network utilization data, the swap utilization data, the memory utilization data, the cache utilization data, and the processor utilization data.

Example 26 includes the subject matter of any of Examples 21-25, and wherein to classify, with use of the parameters of the machine-learning-based algorithm, the impact of the latency of memory accesses on the workload of the compute device comprises to classify, with use of a support vector machine, the impact of the latency of memory accesses on the workload of the compute device.

Example 27 includes the subject matter of any of Examples 21-26, and wherein the plurality of instructions further cause the orchestration system to access telemetry data of training workloads; and train, with use of the telemetry data of the training workloads, the support vector machine.

Example 28 includes the subject matter of any of Examples 21-27, and wherein the telemetry data comprises processor utilization, cache utilization, a number or rate of cache misses, time to execute a workload or task, memory allocation utilization, memory bandwidth, a number or rate of correctable errors, a number or rate of uncorrectable errors, and an amount of swap memory used, wherein to classify, with use of the parameters of the machine-learning-based algorithm, an impact of a latency of memory accesses on a workload of the compute device based on the processor utilization, the cache utilization, the number or rate of cache misses, the time to execute a workload or task, the memory allocation utilization, the memory bandwidth, the number or rate of correctable errors, the number or rate of uncorrectable errors, and the amount of swap memory used.

Example 29 includes the subject matter of any of Examples 21-28, and wherein to allocate, in response to the determination that the impact of the latency of memory accesses on the workload is in the class indicative of an unacceptable impact, the additional resources for the workload on the compute device comprises to move, in response to the determination that the impact of the latency of memory accesses on the workload is in the class indicative of an unacceptable impact, a portion of the data in a first memory device of the compute device to a second memory device of the compute device.

Example 30 includes the subject matter of any of Examples 21-29, and wherein to allocate, in response to the determination that the impact of the latency of memory accesses on the workload is in the class indicative of an unacceptable impact, the additional resources for the workload on the compute device comprises to move, in response to the determination that the impact of the latency of memory accesses on the workload is in the class indicative of an unacceptable impact, all of the data associated with the workload in a first memory device of the compute device to a second memory device of the compute device.

Example 31 includes an orchestration system for managing memory failure of a compute device, the orchestration system comprising memory performance classification circuitry to access parameters of a machine-learning-based algorithm; receive telemetry data of the compute device; and analyze, with use of the parameters of the machine-learning-based algorithm, the telemetry data to generate an output of the machine-learning-based algorithm, wherein the output of the machine-learning-based algorithm indicates a likelihood of failure of a memory device of the compute device.

Example 32 includes the subject matter of Example 31, and wherein the memory performance classification circuitry is further to compare the output of the machine-learning-based algorithm to a predetermined threshold value.

Example 33 includes the subject matter of any of Examples 31 and 32, and wherein the machine-learning-based algorithm is a Bayesian dynamic network.

Example 34 includes the subject matter of any of Examples 31-33, and wherein the telemetry data comprises (i) processor utilization, (ii) cache utilization, (iii) memory utilization, (iv) correctable errors, (v) memory temperature, (vi) instructions per second, and (vii) memory bandwidth, wherein to analyze, with use of the parameters of the machine-learning-based algorithm, the telemetry data to generate the output of the machine-learning-based algorithm comprises to analyze, with use of the parameters of the Bayesian dynamic network, the telemetry data to generate the output of the machine-learning-based algorithm based on (i) the processor utilization, (ii) the cache utilization, (iii) the memory utilization, (iv) the correctable errors, (v) the memory temperature, (vi) the instructions per second, and (vii) the memory bandwidth.

Example 35 includes the subject matter of any of Examples 31-34, and further including memory performance classification training circuitry to access telemetry data of training workloads; train, with use of the telemetry data of the training workloads, the Bayesian dynamic network; and save parameters of the Bayesian dynamic network on the orchestration system.

Example 36 includes the subject matter of any of Examples 31-35, and further including workload allocation circuitry to determine, based on the output of the machine-learning-based algorithm, whether action should be taken to mitigate an impact of failure of the memory device; and move, in response to a determination that action should be taken to mitigate the impact of failure of the memory device, a portion of the data in the memory device of the compute device to a second memory device of the compute device.

Example 37 includes the subject matter of any of Examples 31-36, and further including workload allocation circuitry to determine, based on the output of the machine-learning-based algorithm, whether action should be taken to mitigate an impact of failure of the memory device; and move, in response to a determination that action should be taken to mitigate the impact of failure of the memory device, all data associated with a workload of the compute device in the memory device of the compute device to a second memory device of the compute device.

Example 38 includes a method for managing memory failure of a compute device, the method comprising accessing, by an orchestration system, parameters of a machine-learning-based algorithm; receiving, by the orchestration system, telemetry data of the compute device; and analyzing, by the orchestration system and with use of the parameters of the machine-learning-based algorithm, the telemetry data to generate an output of the machine-learning-based algorithm, wherein the output of the machine-learning-based algorithm indicates a likelihood of failure of a memory device of the compute device.

Example 39 includes the subject matter of Example 38, and further including comparing, by the orchestration system, the output of the machine-learning-based algorithm to a predetermined threshold value.

Example 40 includes the subject matter of any of Examples 38 and 39, and wherein the machine-learning-based algorithm is a Bayesian dynamic network.

Example 41 includes the subject matter of any of Examples 38-40, and wherein the telemetry data comprises (i) processor utilization, (ii) cache utilization, (iii) memory utilization, (iv) correctable errors, (v) memory temperature, (vi) instructions per second, and (vii) memory bandwidth, wherein analyzing, by the orchestration system and with use of the parameters of the machine-learning-based algorithm, the telemetry data to generate the output of the machine-learning-based algorithm comprises analyzing, by the orchestration system and with use of the parameters of the Bayesian dynamic network, the telemetry data to generate the output of the machine-learning-based algorithm based on (i) the processor utilization, (ii) the cache utilization, (iii) the memory utilization, (iv) the correctable errors, (v) the memory temperature, (vi) the instructions per second, and (vii) the memory bandwidth.

Example 42 includes the subject matter of any of Examples 38-41, and further including accessing, by the orchestration system, telemetry data of training workloads; training, by the orchestration system and with use of the telemetry data of the training workloads, the Bayesian dynamic network; and saving, by the orchestration system, parameters of the Bayesian dynamic network on the orchestration system.

Example 43 includes the subject matter of any of Examples 38-42, and further including determining, by the orchestration system and based on the output of the machine-learning-based algorithm, whether action should be taken to mitigate an impact of failure of the memory device; and moving, by the orchestration system and in response to a determination that action should be taken to mitigate the impact of failure of the memory device, a portion of the data in the memory device of the compute device to a second memory device of the compute device.

Example 44 includes the subject matter of any of Examples 38-43, and further including determining, by the orchestration system and based on the output of the machine-learning-based algorithm, whether action should be taken to mitigate an impact of failure of the memory device; moving, by the orchestration system and in response to a determination that action should be taken to mitigate the impact of failure of the memory device, all data associated with a workload of the compute device in the memory device of the compute device to a second memory device of the compute device.

Example 45 includes the subject matter of any of Examples 38-44, and further including replacing, by an administrator of the orchestration system and in response to a determination that action should be taken to mitigate the impact of failure of the memory device, the memory device.

Example 46 includes one or more computer-readable media comprising a plurality of instructions stored thereon that, when executed, causes an orchestration system to access parameters of a machine-learning-based algorithm; receive telemetry data of a compute device; and analyze, with use of the parameters of the machine-learning-based algorithm, the telemetry data to generate an output of the machine-learning-based algorithm, wherein the output of the machine-learning-based algorithm indicates a likelihood of failure of a memory device of the compute device.

Example 47 includes the subject matter of Example 46, and wherein the plurality of instructions further cause the orchestration system to compare the output of the machine-learning-based algorithm to a predetermined threshold value.

Example 48 includes the subject matter of any of Examples 46 and 47, and wherein the machine-learning-based algorithm is a Bayesian dynamic network.

Example 49 includes the subject matter of any of Examples 46-48, and wherein the telemetry data comprises (i) processor utilization, (ii) cache utilization, (iii) memory utilization, (iv) correctable errors, (v) memory temperature, (vi) instructions per second, and (vii) memory bandwidth, wherein to analyze, with use of the parameters of the machine-learning-based algorithm, the telemetry data to generate the output of the machine-learning-based algorithm comprises to analyze, with use of the parameters of the Bayesian dynamic network, the telemetry data to generate the output of the machine-learning-based algorithm based on (i) the processor utilization, (ii) the cache utilization, (iii) the memory utilization, (iv) the correctable errors, (v) the memory temperature, (vi) the instructions per second, and (vii) the memory bandwidth.

Example 50 includes the subject matter of any of Examples 46-49, and wherein the plurality of instructions further cause the orchestration system to access telemetry data of training workloads; train, with use of the telemetry data of the training workloads, the Bayesian dynamic network; and save parameters of the Bayesian dynamic network on the orchestration system.

Example 51 includes the subject matter of any of Examples 46-50, and wherein the plurality of instructions further cause the orchestration system to determine, based on the output of the machine-learning-based algorithm, whether action should be taken to mitigate an impact of failure of the memory device; and move, in response to a determination that action should be taken to mitigate the impact of failure of the memory device, a portion of the data in the memory device of the compute device to a second memory device of the compute device.

Example 52 includes the subject matter of any of Examples 46-51, and wherein the plurality of instructions further cause the orchestration system to determine, based on the output of the machine-learning-based algorithm, whether action should be taken to mitigate an impact of failure of the memory device; and move, in response to a determination that action should be taken to mitigate the impact of failure of the memory device, all data associated with a workload of the compute device in the memory device of the compute device to a second memory device of the compute device.

Example 53 includes an orchestration system for managing failure of a fan of a compute device, the orchestration system comprising fan performance classification circuitry to access parameters of an algorithm for determination of a likelihood of failure of the fan; receive telemetry data of the compute device, wherein the telemetry data comprises speeds of a plurality of fans of the compute device; and analyze, with use of the parameters of the algorithm for determination of a likelihood of failure of the fan, the telemetry data to generate an output of the algorithm for determination of a likelihood of failure of the fan, wherein the output of the algorithm for determination of a likelihood of failure of the fan indicates a likelihood of failure of a fan of the plurality of fans of the compute device.

Example 54 includes the subject matter of Example 53, and wherein the parameters of the algorithm for determination of a likelihood of failure of the fan comprises parameters of a statistical model, wherein to analyze, with use of the parameters of the algorithm for determination of a likelihood of failure of the fan, the telemetry data to generate an output of the algorithm for determination of a likelihood of failure of the fan comprises to analyze, by the orchestration system and with use of the parameters of the statistical model, the telemetry data to generate an output of the statistical model.

Example 55 includes the subject matter of any of Examples 53 and 54, and further including fan performance classification training circuitry to access telemetry data of training workloads; and calculate, with use of the telemetry data of the training workloads, a mean fan speed vector and a covariance matrix, wherein the parameters for the statistical model comprise the mean fan speed vector and the covariance matrix.

Example 56 includes the subject matter of any of Examples 53-55, and wherein to analyze the telemetry data to generate an output of the algorithm for determination of a likelihood of failure of the fan comprises calculate, with use of the statistical model, a T2 statistical value of a fan speed, calculate, with use of the statistical model, an F value of an F-distribution; and determine a difference between the T2 statistical value and the F value.

Example 57 includes the subject matter of any of Examples 53-56, and wherein the parameters of the algorithm for determination of a likelihood of failure of the fan comprises parameters of a naïve Bayesian classifier, wherein to analyze, with use of the parameters of the algorithm for determination of a likelihood of failure of the fan, the telemetry data to generate an output of the algorithm for determination of a likelihood of failure of the fan comprises to analyze, by the orchestration system and with use of the parameters of the naïve Bayesian classifier, the telemetry data to generate an output of the naïve Bayesian classifier.

Example 58 includes the subject matter of any of Examples 53-57, and further including workload allocation circuitry to determine, and based on the output of the algorithm for determination of a likelihood of failure of the fan, whether action should be taken to mitigate an effect failure of the fan; and move, by the orchestration system and in response to a determination that action should be taken to mitigate the impact of failure of the fan, a workload of the compute device to a different compute device.

Example 59 includes a method for managing failure of a fan of a compute device, the method comprising accessing, by an orchestration system, parameters of an algorithm for determination of a likelihood of failure of the fan; receiving, by the orchestration system, telemetry data of the compute device, wherein the telemetry data comprises speeds of a plurality of fans of the compute device; and analyzing, by the orchestration system and with use of the parameters of the algorithm for determination of a likelihood of failure of the fan, the telemetry data to generate an output of the algorithm for determination of a likelihood of failure of the fan, wherein the output of the algorithm for determination of a likelihood of failure of the fan indicates a likelihood of failure of a fan of the plurality of fans of the compute device.

Example 60 includes the subject matter of Example 59, and wherein the parameters of the algorithm for determination of a likelihood of failure of the fan comprises parameters of a statistical model, wherein analyzing, by the orchestration system and with use of the parameters of the algorithm for determination of a likelihood of failure of the fan, the telemetry data to generate an output of the algorithm for determination of a likelihood of failure of the fan comprises analyzing, by the orchestration system and with use of the parameters of the statistical model, the telemetry data to generate an output of the statistical model.

Example 61 includes the subject matter of any of Examples 59 and 60, and further including accessing, by the orchestration system, telemetry data of training workloads; and calculating, by the orchestration system and with use of the telemetry data of the training workloads, a mean fan speed vector and a covariance matrix, wherein the parameters for the statistical model comprise the mean fan speed vector and the covariance matrix.

Example 62 includes the subject matter of any of Examples 59-61, and wherein analyzing the telemetry data to generate an output of the algorithm for determination of a likelihood of failure of the fan comprises calculating, by the orchestration server and with use of the statistical model, a T2 statistical value of a fan speed, calculating, by the orchestration server and with use of the statistical model, an F value of an F-distribution; and determining, by the orchestration server, a difference between the T2 statistical value and the F value.

Example 63 includes the subject matter of any of Examples 59-62, and wherein the parameters of the algorithm for determination of a likelihood of failure of the fan comprises parameters of a naïve Bayesian classifier, wherein analyzing, by the orchestration system and with use of the parameters of the algorithm for determination of a likelihood of failure of the fan, the telemetry data to generate an output of the algorithm for determination of a likelihood of failure of the fan comprises analyzing, by the orchestration system and with use of the parameters of the naïve Bayesian classifier, the telemetry data to generate an output of the naïve Bayesian classifier.

Example 64 includes the subject matter of any of Examples 59-63, and further including determining, by the orchestration system and based on the output of the algorithm for determination of a likelihood of failure of the fan, whether action should be taken to mitigate an effect failure of the fan; and moving, by the orchestration system and in response to a determination that action should be taken to mitigate the impact of failure of the fan, a workload of the compute device to a different compute device.

Example 65 includes the subject matter of any of Examples 59-64, and further including determining, by the orchestration system and based on the output of the algorithm for determination of a likelihood of failure of the fan, whether action should be taken to mitigate an effect failure of the fan; and replacing, by an administrator of the orchestration server and in response to a determination that action should be taken to mitigate the impact of failure of the fan, the fan.

Example 66 includes one or more computer-readable media comprising a plurality of instructions stored thereon that, when executed, causes an orchestration system to access parameters of an algorithm for determination of a likelihood of failure of a fan of a compute device; receive telemetry data of the compute device, wherein the telemetry data comprises speeds of a plurality of fans of the compute device; and analyze, with use of the parameters of the algorithm for determination of a likelihood of failure of the fan, the telemetry data to generate an output of the algorithm for determination of a likelihood of failure of the fan, wherein the output of the algorithm for determination of a likelihood of failure of the fan indicates a likelihood of failure of a fan of the plurality of fans of the compute device.

Example 67 includes the subject matter of Example 66, and wherein the parameters of the algorithm for determination of a likelihood of failure of the fan comprises parameters of a statistical model, wherein to analyze, with use of the parameters of the algorithm for determination of a likelihood of failure of the fan, the telemetry data to generate an output of the algorithm for determination of a likelihood of failure of the fan comprises to analyze, by the orchestration system and with use of the parameters of the statistical model, the telemetry data to generate an output of the statistical model.

Example 68 includes the subject matter of any of Examples 66 and 67, and wherein the plurality of instructions further cause the orchestration system to access telemetry data of training workloads; and calculate, with use of the telemetry data of the training workloads, a mean fan speed vector and a covariance matrix, wherein the parameters for the statistical model comprise the mean fan speed vector and the covariance matrix.

Example 69 includes the subject matter of any of Examples 66-68, and wherein to analyze the telemetry data to generate an output of the algorithm for determination of a likelihood of failure of the fan comprises calculate, with use of the statistical model, a T2 statistical value of a fan speed, calculate, with use of the statistical model, an F value of an F-distribution; and determine a difference between the T2 statistical value and the F value.

Example 70 includes the subject matter of any of Examples 66-69, and wherein the parameters of the algorithm for determination of a likelihood of failure of the fan comprises parameters of a naïve Bayesian classifier, wherein to analyze, with use of the parameters of the algorithm for determination of a likelihood of failure of the fan, the telemetry data to generate an output of the algorithm for determination of a likelihood of failure of the fan comprises to analyze, by the orchestration system and with use of the parameters of the naïve Bayesian classifier, the telemetry data to generate an output of the naïve Bayesian classifier.

Example 71 includes the subject matter of any of Examples 66-70, and wherein the plurality of instructions further cause the orchestration system to determine, and based on the output of the algorithm for determination of a likelihood of failure of the fan, whether action should be taken to mitigate an effect failure of the fan; and move, by the orchestration system and in response to a determination that action should be taken to mitigate the impact of failure of the fan, a workload of the compute device to a different compute device.

The invention claimed is:

1. An orchestration system for managing failure of a fan of a compute device, the orchestration system comprising:
    fan performance classification circuitry to:
        access parameters of an algorithm for determination of a likelihood of failure of the fan;
        receive telemetry data of the compute device, wherein the telemetry data comprises speeds of a plurality of fans of the compute device; and
        analyze, with use of the parameters of the algorithm for determination of a likelihood of failure of the fan, the telemetry data to generate an output of the algorithm for determination of a likelihood of failure of the fan, wherein the output of the algorithm for determination of a likelihood of failure of the fan indicates a likelihood of failure of a fan of the plurality of fans of the compute device, wherein the output of the algorithm is a difference between a statistical value of a fan speed and an F value of an F-distribution; and
    workload allocation circuitry to:
        determine, and based on the output of the algorithm for determination of a likelihood of failure of the fan, whether action should be taken to mitigate an effect failure of the fan; and
        move, by the orchestration system and in response to a determination that action should be taken to mitigate an impact of failure of the fan, a workload of the compute device to a different compute device.

2. The orchestration system of claim 1, wherein the parameters of the algorithm for determination of a likelihood of failure of the fan comprises parameters of a statistical model,
    wherein to analyze, with use of the parameters of the algorithm for determination of a likelihood of failure of the fan, the telemetry data to generate an output of the algorithm for determination of a likelihood of failure of the fan comprises to analyze, by the orchestration system and with use of the parameters of the statistical model, the telemetry data to generate an output of the statistical model.

3. The orchestration system of claim 2, further comprising:
    fan performance classification training circuitry to:
        access telemetry data of training workloads; and
        calculate, with use of the telemetry data of the training workloads, a mean fan speed vector and a covariance matrix, wherein the parameters for the statistical model comprise the mean fan speed vector and the covariance matrix.

4. The orchestration system of claim 3, wherein to analyze the telemetry data to generate an output of the algorithm for determination of a likelihood of failure of the fan comprises:
    calculate, with use of the statistical model, a $T^2$ statistical value of the fan speed,
    calculate, with use of the statistical model, the F value of the F-distribution; and determine a difference between the $T^2$ statistical value and the F value.

5. The orchestration system of claim 1, wherein the parameters of the algorithm for determination of a likelihood of failure of the fan comprises parameters of a naïve Bayesian classifier, wherein to analyze, with use of the parameters of the algorithm for determination of a likelihood of failure of the fan, the telemetry data to generate an output of the algorithm for determination of a likelihood of failure of the fan comprises to analyze, by the orchestration system and with use of the parameters of the naïve Bayesian classifier, the telemetry data to generate an output of the naïve Bayesian classifier.

\* \* \* \* \*